(12) United States Patent
Tanaka et al.

(10) Patent No.: US 8,086,188 B2
(45) Date of Patent: Dec. 27, 2011

(54) TRANSCEIVER

(75) Inventors: Satoshi Tanaka, Kokubunji (JP);
Hiroshi Kamizuma, Kokubunji (JP);
Koji Maeda, Kokubunji (JP); Sungwoo Cha, Takasaki (JP); Yukinori Akamine, Kokubunji (JP); Taizo Yamawaki, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 693 days.

(21) Appl. No.: 12/135,190

(22) Filed: Jun. 8, 2008

(65) Prior Publication Data

US 2008/0311860 A1    Dec. 18, 2008

(30) Foreign Application Priority Data

Jun. 15, 2007    (JP) .................... 2007-158610

(51) Int. Cl.
*H04B 1/38* (2006.01)
(52) U.S. Cl. ............... 455/73; 455/76; 455/91; 455/88; 455/118
(58) Field of Classification Search .............. 455/73, 455/76, 91, 118, 88, 130, 260, 264, 293, 455/326
See application file for complete search history.

(56) References Cited

U.S. PATENT DOCUMENTS

2003/0190905 A1\* 10/2003 Carpineto ................ 455/323
2004/0033785 A1    2/2004 Kasahara et al.
2008/0160945 A1\* 7/2008 Crinon et al. ............ 455/234.1

FOREIGN PATENT DOCUMENTS

JP    2003-152558 A    5/2003
JP    2003-324366 A    11/2003

OTHER PUBLICATIONS

Abdellatif Bellaouar, "RF Transmitter Architectures for Integrated Wireless Transceivers", The Eleventh International Conference on Microelectronics, 1999, Nov. 22-24, 1999, pp. 25-30.
Gabriel Brenna et al., "A 2-GHz Carrier Leakage Calibrated Direct-Conversion WCDMA Transmitter in 0.13μm CMOS" IEEE Journal of Solid-State Circuits, vol. 39, No. 8, Aug. 2004, pp. 1253-1262.
Rahul Magoon et al., "A Single-Chip Quad-Band (850/900/1800/1900 MHz) Direct Conversion GSM/GPRS RF Transceiver Fractional-$N$ Synthesizer", IEEE Journal of Solid-State Circuits, vol. 37, No. 12 Dec. 2002, pp. 1710-1720.

\* cited by examiner

*Primary Examiner* — Tuan Pham
(74) *Attorney, Agent, or Firm* — Miles & Stockbridge P.C.

(57) ABSTRACT

The transmitter of the transceiver includes: a transmitter-side mixers of a transmitter-side modulator; a transmitter-side voltage-controlled oscillator; and a transmitter-side divider. The divider having a dividing factor of a non-integral number is supplied with an oscillating output of the oscillator. A pair of non-quadrature local signals having a phase difference of 90° plus a predetermined offset angle is produced by the divider and supplied to the mixers. The transmitter includes a phase-shift unit which converts a pair of quadrature transmit signals having a phase difference of about 90° on an analog basis into a pair of non-quadrature shifted transmit signals. Consequently, quadrature modulation is performed by the mixers. Use of a similar configuration enables the reduction in interference of an RF signal with local signals supplied to receiver-side mixers of the receiver.

10 Claims, 17 Drawing Sheets

TRANSCEIVER

CLAIM OF PRIORITY

The Present application claims priority from Japanese application JP 2007-158610 filed on Jun. 15, 2007, the content of which is hereby incorporated by reference into this application.

FIELD OF THE INVENTION

The present invention relates to a transceiver which has a receiver and a transmitter, and is used in RF communications by mobile phones, wireless LANs and the like. Particularly, it relates to a useful technique useful for reducing the interference on local signals supplied to a transmitter-side modulator or a receiver-side demodulator by RF signals.

BACKGROUND OF THE INVENTION

The ubiquitous coverage, which is an ability of communication terminal devices such as mobile phone terminals communicating by wireless anywhere in the world has not been actualized today, but has been under development.

Their mobile systems include GSM, GPRS, EDGE, WCDMA, DCS and PCS cellular systems. The systems have the feature of signals according to a constant envelope and the feature of signals following a changing envelope. In addition, there have been growing demands for multiband and multimode materialized by a wider range of combinations of the time division multiplex and code division multiplex. Now, it is noted that GSM is an abbreviation of Global System for Mobile Communication, and GPRS is an abbreviation of General Packet Radio Service. EDGE is an abbreviation of Enhanced Data for GSM Evolution or Enhanced Data for GPRS. WCDMA is an abbreviation of Wideband Code Division Multiple Access. DCS is an abbreviation of Digital Cellular System. PCS is an abbreviation of Personal Communication System.

There is a description about a typical two-step transmitter in a non-patent document presented by Abdellatif Bellaouar, "RF Transmitter Architectures for Integrated Wireless Transceivers", The Eleventh International Conference on Microelectronics, 1999, 22-24 Nov. 1999, pp. 25-30 (hereinafter referred to as "Non-Patent Document 1"). The typical two-step transmitter has a quadrature modulator including mixers, a $\pi/2$-phase divider and an adder, a first band-pass filter, an RF mixer, a buffer amplifier and a second band-pass filter, in which an output signal of the second band-pass filter is supplied to an RF power amplifier. In such two-step transmitter, a pair of base band signals I and Q is supplied to one input terminals of the two mixers of the quadrature modulator, an intermediate-frequency local signal is supplied to an input terminal of the $\pi/2$-phase divider, and two outputs of the $\pi/2$-phase divider, which differ in phase by $\pi/2$ (90°), are supplied to the other input terminals of the two mixers. Two output signals of the two mixers are supplied to two input terminals of the adder. Thus, a baseband signal is converted up to an intermediate frequency of e.g. 70 MHz by use of the intermediate-frequency local signal. Between an output of the adder of the quadrature modulator and one input terminal of the RF mixer is connected a first band-pass filter for removing harmonics of the intermediate frequency. To the other input terminal of the RF mixer, an RF (radio frequency) local signal is supplied. An RF output signal from the RF mixer is amplified by the buffer amplifier, and then supplied to the second band-pass filter for removing an undesired sideband. The solution of using a filter for the purpose of attenuating a high-level sideband would be very simple and work well with a low electric power, however such filter is hard to realize and needs a physically large off-chip size. Further, Non-patent Document 1 presented by Abdellatif Bellaouar introduces a direct up-conversion architecture which can be realized with a smaller number of devices, too. According to the architecture, a baseband signal is directly converted into an RF transmit signal at the output of the adder of the quadrature modulator by use of an RF local signal supplied to the $\pi/2$-phase divider of the quadrature modulator.

The direct up-conversion (DUC) architecture is introduced as a promising art which can materialize a high-packing density transmitter by decreasing costly external parts, in another non-patent document presented by Gabriel Brenna et al, "A 2-GHz Carrier Leakage Calibrated Direct-Conversion WCDMA Transmitter in 0.13-μm CMOS", IEEE JOURNAL OF SOLID-STATE CIRCUITS, VOL. 39, NO. 8, AUGUST 2004, PP. 1253-1262 (hereinafter referred to as "Non-patent Document 2"). According to the DUC transmitter architecture, I and Q transmit baseband signals are supplied to I/Q modulator through corresponding baseband filters. The I/Q modulator converts transmit baseband signals to a radio frequency (RF). With the radio frequency, I and Q signals are combined, and amplified. The signals undergo external filtering and further amplification, and are supplied to a duplexer before they are sent out trough an antenna. To reduce the oscillator pulling by the output of a power amplifier (PA), the local oscillator (LO) is set to 4 GHz, which is twice a carrier frequency. For the purpose of producing an accurate quadrature local signal of 2 GHz, a digital divider is used. Also, in this document, it is reported that carrier leakage is a serious drawback of DUC architecture. The carrier leakage forms an interference signal of about 1.9 GHz within the WCDMA signals' frequency band ranging 1.895 to 1.905 GHz. The carrier leakage will cause EVM (error vector magnitude) and ACPR (Adjacent Channel Power Ratio) to deviate from the specifications. Further, according to this document, offset calibration in which a 6-bit current source is used for two operational amplifiers of baseband filters is adopted to suppress the carrier leakage. Still further, according to this document, carrier leakage calibration in which a 5-bit binary weighting current source is used is adopted to suppress the carrier leakage. The power of carrier leakage is detected by an on-chip power detector in the condition of no transmit signal. The resultant analog output voltage of the detector is converted into a digital signal by use of an automatic digital calibration algorithm. The algorithm controls the modulators and a calibration circuit for the baseband filter so that the measured carrier leakage is minimized.

The patent document JP-A-2003-152558 contains the description about prevention of the interference owing to the entry of a modulated transmit signal into a local oscillator in the case where the transmitter frequency agrees with the frequency of the local oscillator in the direct conversion system. Therefore, according to the document JP-A-2003-152558, a local signal from the local oscillator is supplied to a band-pass filter, whereby a predetermined harmonic (e.g. third harmonic) is eliminated. The harmonic is divided with a predetermined dividing factor to make setting so that the transmit signal frequency is not an integer multiple of the number of the oscillating frequency of the local oscillator.

In the patent document JP-A-2003-324366, it is described that the ratio C/D of the receive frequency vs. the oscillating frequency of the receiver-system local oscillator is made different from the ratio A/B of the transmitter frequency vs. the oscillating frequency of the transmitter-system local oscillator in order to reduce the bad influence on the receive sensitivity by the interference by receiver-system and transmitter-system local oscillators.

SUMMARY OF THE INVENTION

As stated in Non-patent Document 2 presented by Gabriel Brenna et al, in regard to an RF semiconductor integrated circuit for communications, hereinafter referred to as "communication RF IC", it is necessary to suppress the carrier signal leakage into a frequency band of transmit signals of a transceiver as low as possible.

The inventors had been involved in the development of a communication RF IC which enables communications according to WCDMA system prior to the invention. For a transmitter incorporating such communication RF IC, it has been examined to adopt DUC architecture.

FIG. 1 is a diagram showing a DUC architecture-based transmitter of a communication RF IC, which has been examined prior to the invention. As in FIG. 1, analog baseband transmit signals TxABI and TxABQ supplied to input terminals 15 and 16 for analog I and Q signals are amplified by variable-gain amplifiers 94 and 95, and supplied to one input terminals of a pair of mixers 1 and 2 constituting I/Q modulator. To a VCO input terminal 96 of a divider 36 with its dividing factor set to two, a transmitter-side voltage-controlled oscillation signal $f_{Tx}$-VCO of a frequency of 4.0 GHz is supplied. Thus, 2.0-GHz-frequency transmitter-side local signals $f_{Tx}$-LO differing in phase by 90° ($\pi/2$) are supplied to the other input terminals of the pair of mixers 1 and 2 through two output terminals of the divider 36. The RF output signals from the paired mixers 1 and 2 are combined and then amplified by a variable-gain amplifier 8, whereby RF transmit signals are produced and output through an output terminal 14 of the transmitter.

FIG. 2 is an illustration showing the relation of signal frequencies at certain parts of the DUC architecture-based transmitter as shown in FIG. 1. As in FIG. 2, frequency signal components of the RF transmit signal 23 from the output terminal 14 of the transmitter are distributed near the transmitter-side local signal 22 ($f_{Tx}$-LO) having a frequency $f_{Tx}$ of 2.0 GHz. Also, frequency signal components of a second harmonic 38 of the RF transmit signal 23 from the output terminal 14 of the transmitter are distributed near the transmitter-side voltage-controlled oscillation signal 37 ($f_{Tx}$-VCO) of a frequency $2f_{Tx}$ of 4.0 GHz. As a result of the examination, the inventors have found the problem that the interference on the transmitter-side voltage-controlled oscillation signal 37 ($f_{Tx}$-VCO) at the input terminal 96 of the divider 36 by the second harmonic 38 of the RF transmit signal 23 causes an injection lock phenomenon. In the injection lock phenomenon, the second harmonic 38 of the RF transmit signal 23 from the output terminal 14 of the transmitter becomes an interference signal with respect to the transmitter-side voltage-controlled oscillation signal 37 at the input terminal 96 of the divider 3, and thus the accuracy of phase of the transmitter-side local signal is deteriorated.

Therefore, the inventors examined that no transmitter-side voltage-controlled oscillator is formed on the chip of a communication RF IC for the purpose of reducing the interference as shown in FIG. 1. In fact, it is not described in Non-patent Document 2 presented by Gabriel Brenna et al. that an oscillator which produces a transmitter local signal of a frequency of 4 GHz is provided in the on-chip according to DUC architecture. However, when no transmitter-side voltage-controlled oscillator is formed in the chip of a communication RF IC, the practical worth of the communication RF IC is decreased remarkably.

Further, there is a way to eliminate a predetermined harmonic (e.g. third harmonic) form a signal from a transmitter-side, local oscillator by use of a band-pass filter as described in JP-A-2003-152558. However, as a result of the examination, the inventors have found the problem that fundamental wave components from the transmitter-side local oscillator are discarded, and therefore the S/N ratio is degraded, resulting in an increase in EVM (Error Vector Magnitude).

Still further, as a result of the examination, the inventors have found the problem that the method as described in JP-A-2003-324366 can reduce the interference between the receiver-system local oscillator and the transmitter-system local oscillator, whereas the method cannot solve the problem of an injection lock phenomenon caused in a DUC architecture-based transmitter.

FIG. 3 is a diagram showing a DUC architecture-based transmitter of a communication RF IC of another style, which had been examined prior to the invention. The chip of the communication RF IC as shown in FIG. 3 has a transmitter-side voltage-controlled oscillator 4 and an RF phase-locked loop circuit 5 incorporated therein for producing a transmitter-side local signal. Also, the chip has a poly-phase filter (PPF) 21 incorporated therein for reducing the deterioration in the accuracy of phase of the transmitter-side local signal. Specifically, the poly-phase filter 21 includes a plurality of resistors R1 to R8 and a plurality of capacitors C1 to C8, and therefore the accuracy of phase of a transmitter-side local signal produced by the poly-phase filter 21 can be enhanced. Transmitter-side oscillation signals Tx-VCO and /φTx-VCO produced by the transmitter-side voltage-controlled oscillator 4 and opposite to each other in phase, are supplied to the poly-phase filter 21. A pair of transmitter-side local signals φITx-LO and φQTx-LO supplied to a pair of mixers 1 and 2 differ in phase exactly by 90° ($\pi/2$). Likewise, a pair of transmission-use local signals /φITx-LO and /φQTx-LO, which have a reversed phase and are supplied to the pair of mixers 1 and 2, differ in phase exactly by 90° ($\pi/2$).

FIG. 4 is an illustration showing the relation of signal frequencies at certain parts of the DUC architecture-based transmitter as shown in FIG. 3. Specifically, in the communication RF IC as shown in FIG. 3, frequency signal components of the RF transmit signal 23 from the output terminal 14 of the transmitter are distributed near the transmitter-side voltage-controlled oscillation signal 22, which has a frequency $f_{Tx}$-VCO and is generated by the transmitter-side voltage-controlled oscillator 4, as shown in FIG. 4. As a result, in the communication RF IC as shown in FIG. 3, the interference on the transmitter-side voltage-controlled oscillation signal 22 by the RF transmit signal 23 will cause an injection lock phenomenon.

FIG. 5 is an illustration for explaining a mechanism of occurrence of an injection lock phenomenon in the communication RF IC as shown in FIG. 3. As shown in FIG. 5, the variable-gain amplifier 8 which produces the RF transmit signal 23 launched from the output terminal 14 of the transmitter and the transmitter-side voltage-controlled oscillator 4 which produces the transmitter-side voltage-controlled oscillation signal 22 are often supplied with a source voltage Vdd from a common power source 24. The source voltage Vdd is supplied to the transmitter-side voltage-controlled oscillator 4 through the source line 25 from the power source 24. Further, the source voltage Vdd is supplied to the variable-gain amplifier 8 through another source line 28. Also, the transmitter-side voltage-controlled oscillator 4 is supplied with an oscillating frequency-control signal Vc from the RF phase-locked loop circuit 5. However, a disturbance conducted from the variable-gain amplifier 8 to the transmitter-side voltage-controlled oscillator 4 through the source line 28 induces the interference by the RF transmit signal 23 with the transmitter-side voltage-controlled oscillation signal 22, whereby an injection lock phenomenon is caused.

FIG. 6 is an illustration for explaining the feature of an injection lock phenomenon occurring in the communication RF IC as shown in FIG. 3. As shown in FIG. 6, at a frequency lower than an oscillating frequency $f_0$ of the transmitter-side voltage-controlled oscillator 4, an interference signal higher in level than a line L1 causes an injection lock phenomenon, whereas at a frequency higher than the oscillating frequency $f_0$, an interference signal higher in level than a line L2 causes an injection lock phenomenon. In other words, in a portion where a region 30 of interference signals with the levels higher than the signal levels indicated by the lines L1 and L2 overlaps with the distribution of RF transmit signals 23 launched from the output terminal 14 of the transmitter, an injection lock phenomenon occurs. When the RF transmit signal 23 has a frequency near the oscillating frequency $f_0$ of the transmitter-side voltage-controlled oscillator 4, an interference signal of a low level causes an injection lock phenomenon. When an injection lock phenomenon is caused, the oscillating frequency of the transmitter-side voltage-controlled oscillation signal 22, which the transmitter-side voltage-controlled oscillator 4 offers, cannot be determined by the oscillating frequency-control signal Vc, and it is locked to a frequency of the RF transmit signal 23.

FIG. 7 is a diagram for more specifically explaining a mechanism of occurrence of an injection lock phenomenon in the communication RF IC as shown in FIG. 3. As shown in FIG. 7, the RF phase-locked loop circuit 5 which produces an oscillating frequency-control signal Vc to be supplied to the transmitter-side voltage-controlled oscillator 4 includes: a divider 31; a phase comparator 32; a charge pump circuit 33; and a low-pass filter 34. The divider 31 has an input activated by the transmitter-side voltage-controlled oscillation signal 22 from the transmitter-side voltage-controlled oscillator 4. The output of the divider 31 is supplied to one input terminal of the phase comparator 32. The other input terminal of the phase comparator 32 is supplied with a reference frequency $f_{REF}$. The output of the phase comparator 32 is supplied to an input terminal of the charge pump circuit 33. The output of the charge pump circuit 33 is supplied to an input terminal of the low-pass filter 34. The output of the low-pass filter 34 makes an oscillating frequency-control signal Vc to be supplied to the transmitter-side voltage-controlled oscillator 4.

FIG. 8 is an illustration for more specifically explaining the feature of an injection lock phenomenon occurring in the communication RF IC as shown in FIG. 3. As shown in FIG. 8, the RF phase-locked loop circuit 5 as shown in FIG. 7 is more resistant to an interference in a center portion 35 of the PLL lock frequency $f_0$ depending on the dividing factor of the divider 31 and the reference frequency $f_{REF}$. However, the RF phase-locked loop circuit 5 as shown in FIG. 7 is less resistant to an interference in a low-frequency region 36 and a high-frequency region 37 respectively located below and above the center portion 35 of the PLL lock frequency $f_0$.

FIG. 9 is a graph showing an effect of disturbance on a frequency region near the PLL lock frequency $f_0$ in the communication RF IC as shown in FIG. 3. The cut-off frequency of the RF phase-locked loop circuit 5 is set to 30 kHz, and the disturbance attributed to the RF transmit signal 23 launched from the output terminal 14 of the transmitter is set to −40 dBm. It is seen from FIG. 9 that the effect of interference owing to the largest phase error PE (deg.) arises at an offset frequency f_ofs substantially equal to the cut-off frequency 30 kHz of the RF phase-locked loop circuit 5.

As a result of the examination by the inventors prior to the invention as described above, the invention was made. Therefore, it is an object of the invention to reduce the interference attributed to an RF transmit signal from a transmitter with a transmitter-side local signal produced by a transmitter-side voltage-controlled oscillator and supplied to a transmitter-side modulator. Also, it is an object of the invention to reduce the interference attributed to an RF receive signal of a receiver with a receiver-side local signal produced by a receiver-side voltage-controlled oscillator and supplied to a receiver-side demodulator.

The above and other objects and novel features of the invention will be apparent from the description hereof and accompanying drawings.

Now, of transceivers according to embodiments of the invention disclosed herein, preferred ones will be outlined briefly below.

A transmitter of a transceiver according to an embodiment of the invention includes transmitter-side modulators (1, 2), a transmitter-side voltage-controlled oscillator (4), and a transmitter-side divider (3). The transmitter-side divider having a dividing factor set to a non-integral number is supplied with a transmitter-side oscillating output signal from a transmitter-side voltage-controlled oscillator, whereby a pair of non-quadrature local signals having a phase difference of 90° plus a predetermined offset angle is produced in the transmitter-side divider, and supplied to the transmitter-side modulators. The transmitter includes a phase-shift unit (11) which converts a pair of quadrature transmit signals (I, Q) having a phase difference of about 90° on an analog basis into a pair of non-quadrature shifted transmit signals (I', Q') having a phase difference of 90° plus a predetermined offset angle on an analog basis (see FIGS. 10 and 11).

A receiver of a transceiver according to another preferred embodiment of the invention includes a low-noise amplifier (85), a receiver-side demodulator (86I, 86Q), a receiver-side voltage-controlled oscillator (4) and a receiver-side divider (3). When the receiver-side oscillating output signal produced by the receiver-side voltage-controlled oscillator is supplied to the receiver-side divider with its dividing factor set to a non-integral number, a pair of non-quadrature local signals having a phase difference of 90° plus a predetermined offset angle is produced by the receiver-side divider and supplied to the receiver-side modulator. A pair of non-quadrature receive signals (I', Q') having a phase difference of 90° plus a predetermined offset angle as an analog receive signal from an output of the receiver-side modulator is converted by a phase-shift unit (90) into a pair of quadrature shifted receive signals (I, Q) having a phase difference of about 90° on an analog basis (see FIGS. 24 and 26).

Now, the effects which can be achieved by preferred one of embodiments of the invention herein disclosed will be described below in brief.

According to the invention, it is possible to reduce the interference of an RF transmit signal coming from a transmitter with a transmitter-side local signal produced by a transmitter-side voltage-controlled oscillator and supplied to a transmitter-side modulator. Also, according to the invention, it is possible to reduce the interference on a receiver-side local signal produced by a receiver-side voltage-controlled oscillator and supplied to a receiver-side demodulator by an RF receive signal of a receiver.

DETAILED DESCRIPTION OF THE PREFERRED EMBODIMENTS

1. Summary of the Preferred Embodiments

Figure 1:
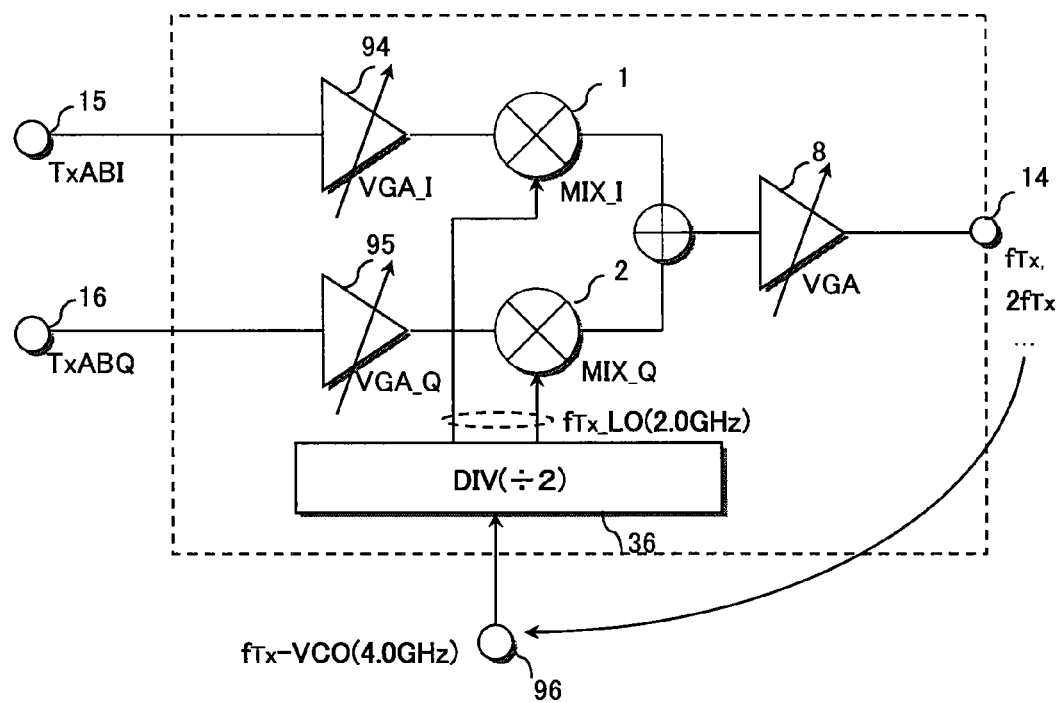
FIG. 1 is a diagram showing a DUC architecture-based transmitter of a communication RF IC, which has been examined prior to the invention.
Figure 2:
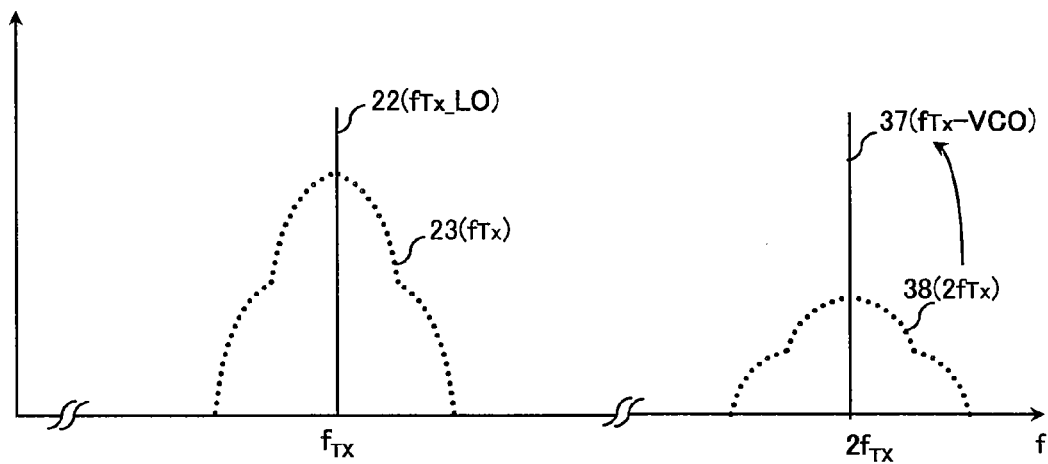
FIG. 2 is an illustration showing the relation of signal frequencies at certain parts of the DUC architecture-based transmitter as shown in FIG. 1.
Figure 3:
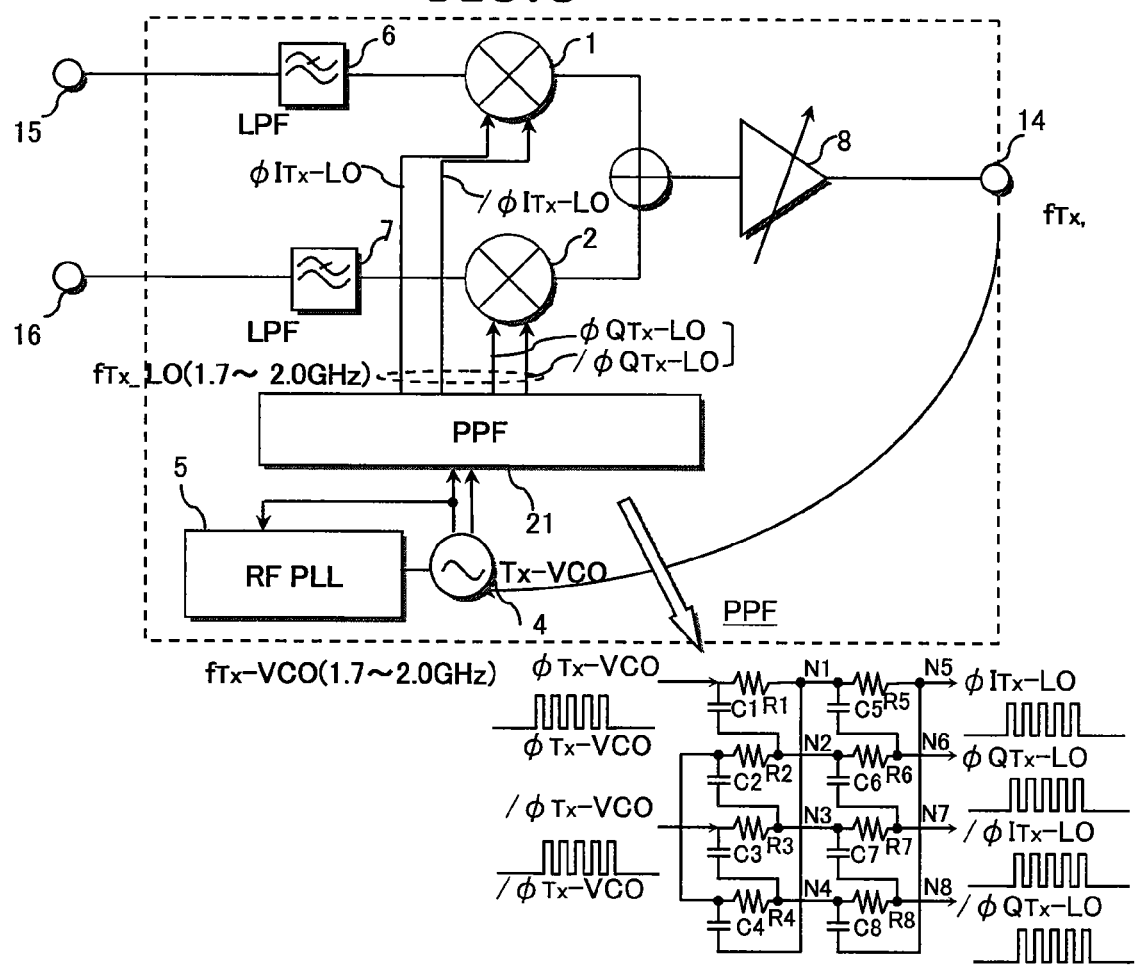
FIG. 3 is a diagram showing a DUC architecture-based transmitter of a communication RF IC of another style, which had been examined prior to the invention.
Figure 4:
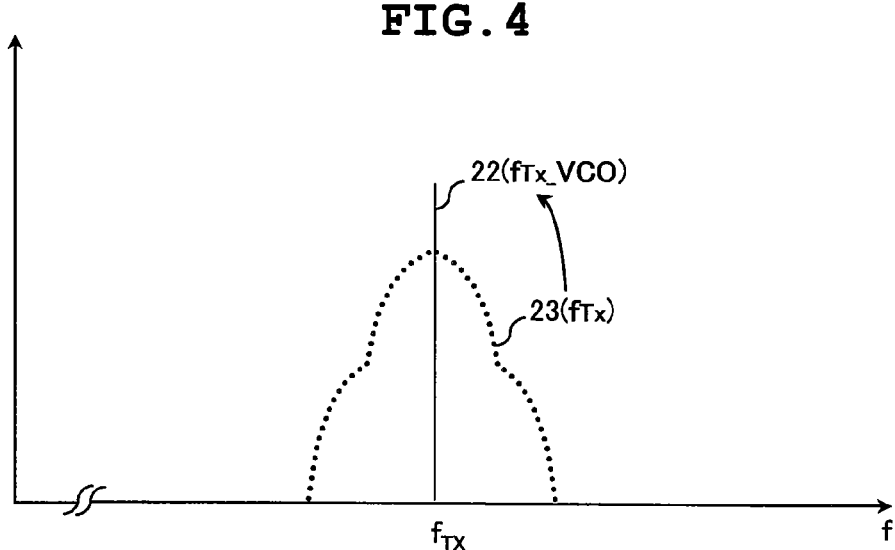
FIG. 4 is an illustration showing the relation of signal frequencies at certain parts of the DUC architecture-based transmitter as shown in FIG. 3.
Figure 5:
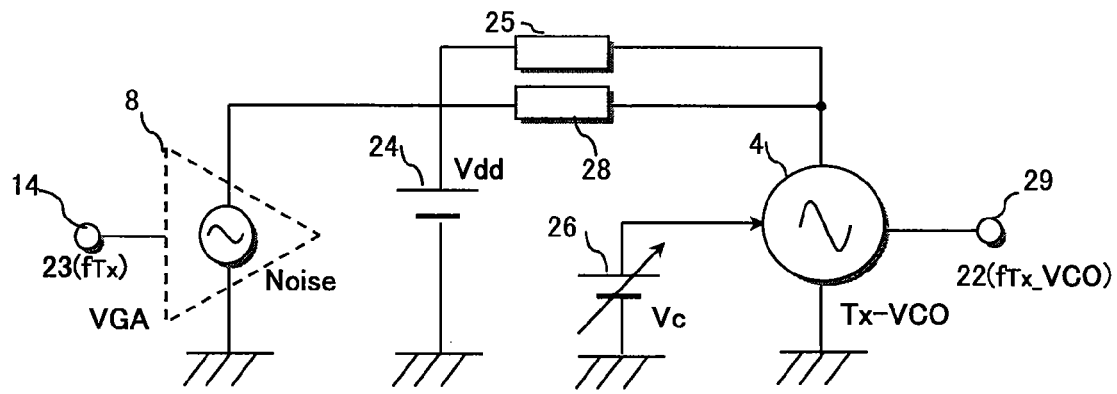
FIG. 5 is an illustration for explaining a mechanism of occurrence of the injection lock phenomenon in the communication RF IC as shown in FIG. 3.
Figure 6:
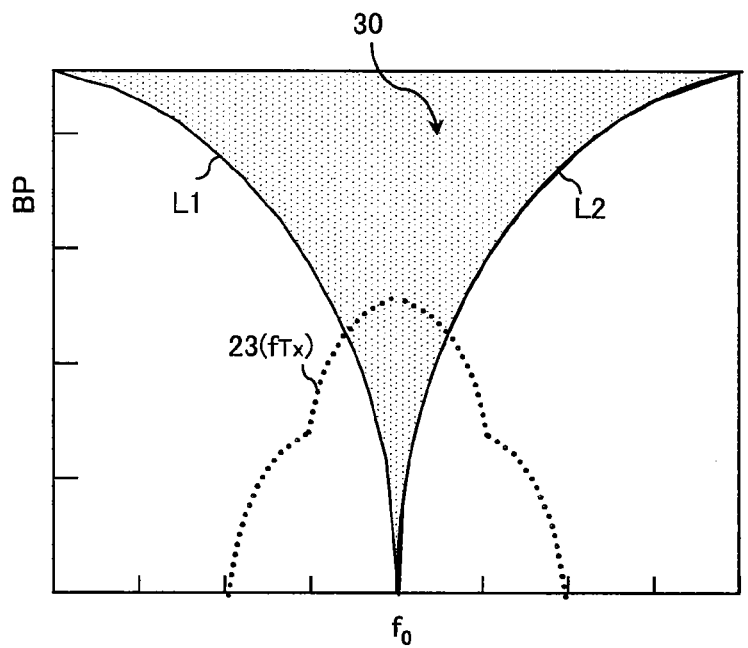
FIG. 6 is an illustration for explaining the feature of an injection lock phenomenon occurring in the communication RF IC as shown in FIG. 3.

First, the preferred embodiments of the invention herein disclosed will be presented in outline. In the description here, the reference numerals, characters or signs to refer to the drawings, which are accompanied with paired round brackets, only exemplify what the concepts of components referred to by the numerals, characters or signs contain.

[1] A transceiver according to a preferred embodiment of the invention has a receiver including a receiver-side demodulator for converting a received RF receive signal into an analog receive signal, and a transmitter including a transmitter-side modulator for converting an analog transmit signal into an RF transmit signal.

The transmitter further includes a digital-to-analog converter (9,10) for converting a digital transmit signal (I, Q) into the analog transmit signal (I', Q'). The transmitter further includes: a transmitter-side voltage-controlled oscillator (4); and a transmitter-side divider (3) for frequency-dividing a transmitter-side oscillating output signal (φ0) produced by the transmitter-side voltage-controlled oscillator thereby to produce a first transmitter-side local signal (φITx-LO) and a second transmitter-side local signal (φQTx-LO) to be supplied to the transmitter-side modulator. The dividing factor of the transmitter-side divider is set to a non-integral number larger than one. The transmitter-side divider having the dividing factor set to the non-integral number is composed of a logic divider which performs a logic operation thereby to produce the first and second transmitter-side local signals differing in phase (see FIG. 12).

The first and second transmitter-side local signals produced by the transmitter-side divider make a pair of non-quadrature local signals having a phase difference of 90° plus a predetermined local offset angle. The digital transmit signal consists of a pair of quadrature transmit signals having a phase difference of about 90° on an analog basis.

The transmitter further includes a phase-shift unit (11) for converting the pair of quadrature transmit signals into a pair of non-quadrature shifted transmit signals having a phase difference of 90° plus a predetermined transmit signal offset angle on an analog basis.

In the transmitter-side modulator of the transmitter, mixing of the pair of non-quadrature shifted transmit signals from the phase-shift unit, and the pair of non-quadrature local signals from the transmitter-side divider is performed.

Figure 10:
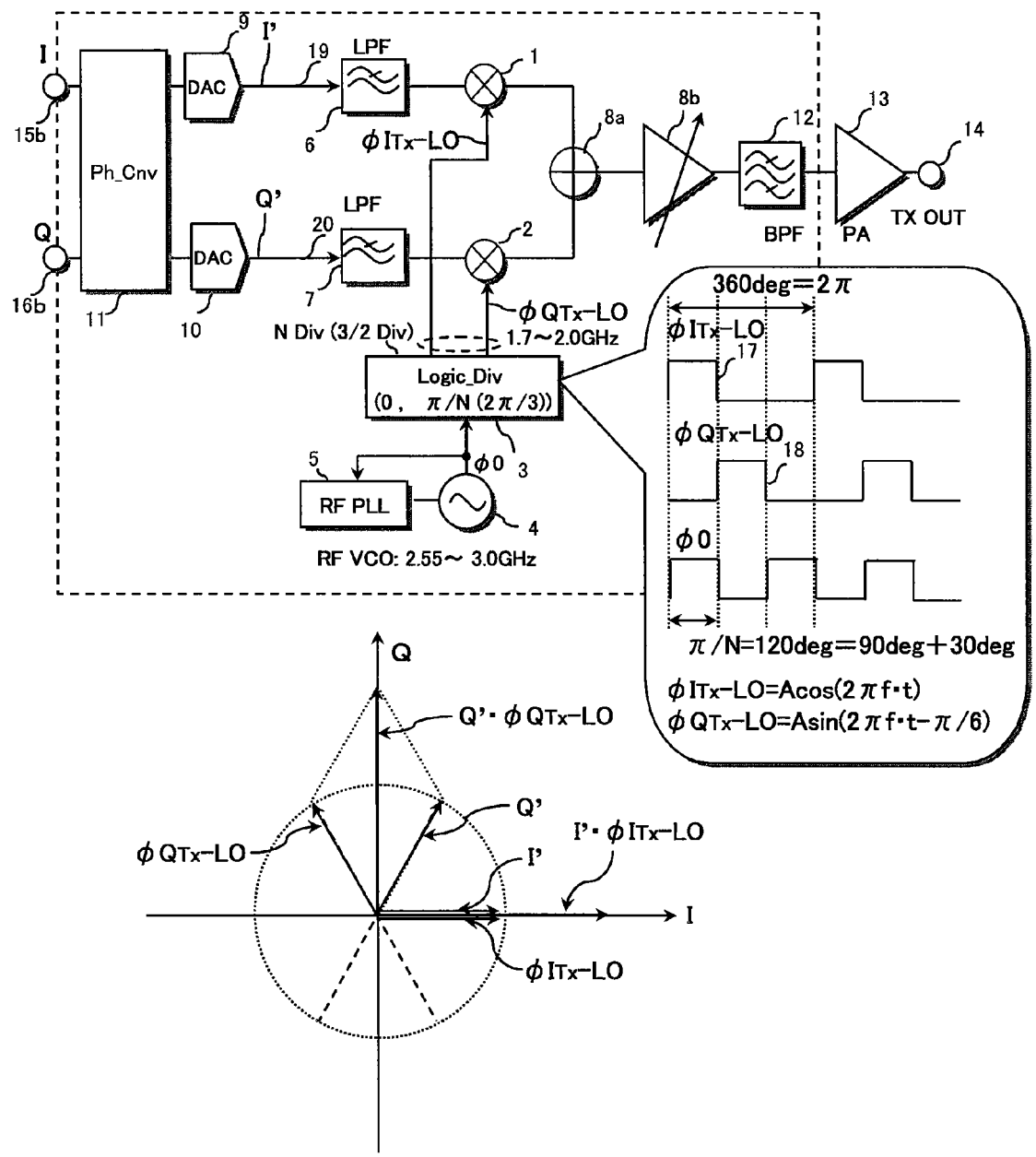
FIG. 10 is a diagram showing a DUC architecture-based transmitter of a communication RF IC according to an embodiment of the invention.
Figure 11:
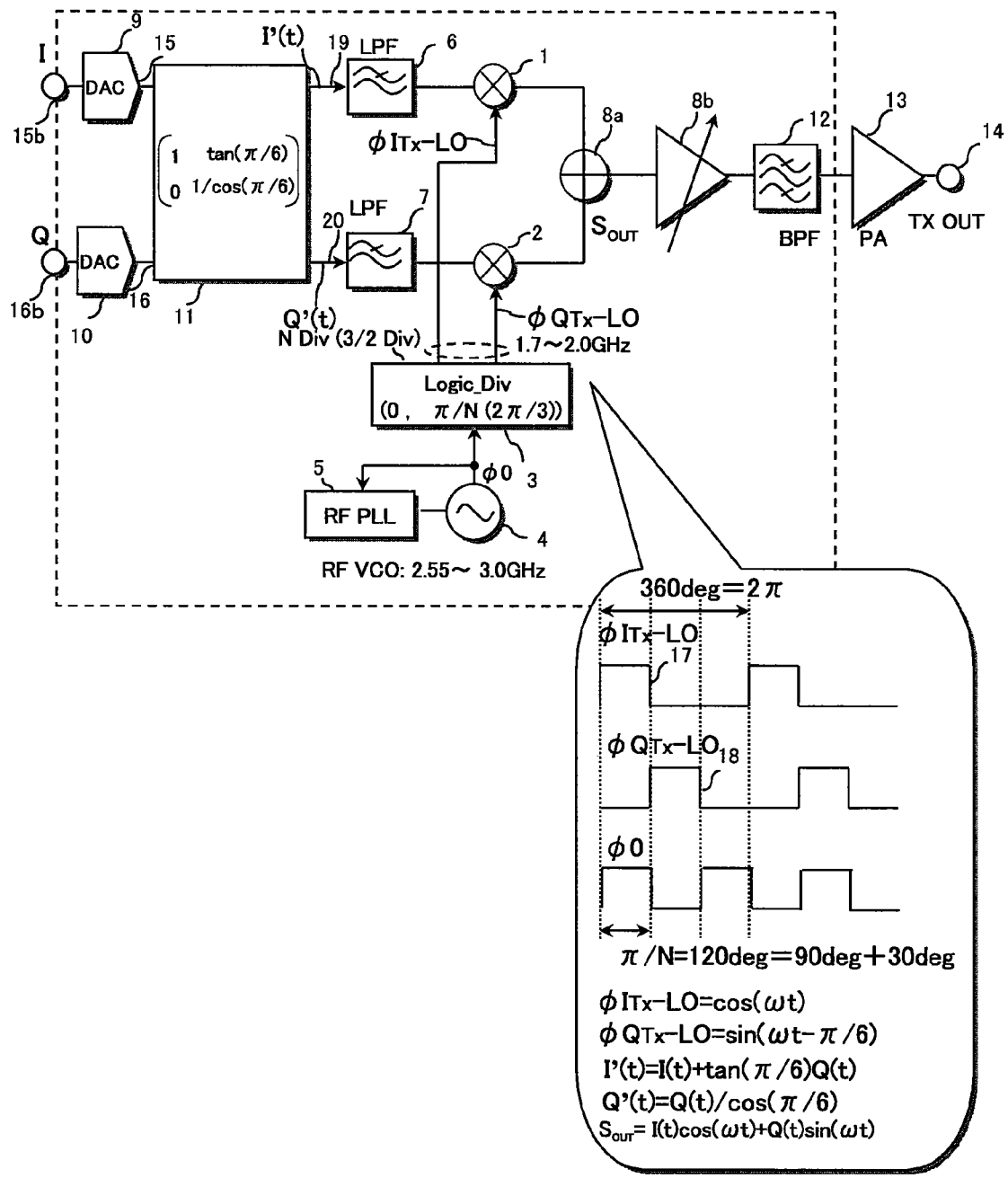
FIG. 11 is a diagram showing a primary portion of a DUC architecture-based transmitter of a communication RF IC according to another embodiment of the invention.

The RF transmit signal is formed by outputs of the transmitter-side modulator of the transmitter according to quadrature modulation as a result of the mixing (see FIGS. 10 and 11).

According to the above embodiment, the dividing factor of the transmitter-side divider is set to a non-integral number, and thus it becomes possible to reduce the interference on a transmitter-side local signal from the transmitter-side divider by harmonics of the RF transmit signal. The transmitter-side divider having the dividing factor set to the non-integral number is composed of a logic divider which performs a logic operation thereby to produce the first and second transmitter-side local signals differing in phase. As a result, the amplitude of the first and second transmitter-side local signals is made the full width between the source and ground voltages, and therefore the problems of the degradation of S/N ratio and the increase of EVM (error vector magnitude) as stated in JP-A-2003-152558 can be avoided.

As a preferable embodiment, the transmitter-side modulator includes a first mixer (1), a second mixer (2) and an adder (8a). When the transmitter-side oscillating output signal produced by the transmitter-side voltage-controlled oscillator is supplied to the transmitter-side divider, the transmitter-side divider produces the first and second transmitter-side local signals to be supplied to the first and second mixers respectively. An analog signal phase difference between first and second analog transmit signals to be supplied to the first and second mixers respectively as the pair of non-quadrature shifted transmit signals is 90° plus a predetermined analog offset angle. The RF transmit signal is formed by an output of the adder connected to outputs of the first and second mixers of the transmitter-side modulator.

As a more preferable embodiment, the digital transmit signal includes first and second digital transmit signals. The first and second digital transmit signals are supplied to first and second input terminals of the phase-shift unit respectively. The digital-to-analog converter includes a first digital-to-analog converter supplied with a first digital shifted transmit signal from a first output terminal of the phase-shift unit, and a second digital-to-analog converter supplied with second digital shifted transmit signal from a second output terminal of the phase-shift unit. The first digital shifted transmit signal from the first output terminal of the phase-shift unit, and the second digital shifted transmit signal from the second output terminal are set to have a phase difference of 90° plus the predetermined transmit signal offset angle on an analog basis (see FIG. 10).

According to a more preferable embodiment, the predetermined transmit signal offset angle can be set by digital signal processing by the phase-shift unit.

As another preferable embodiment, the digital transmit signal includes first and second digital transmit signals. The digital-to-analog converter includes a first digital-to-analog converter supplied with the first digital transmit signal, and a second digital-to-analog converter supplied with the second digital transmit signal. The first analog transmit signal from the first digital-to-analog converter, and the second analog transmit signal from the second digital-to-analog converter are supplied to first and second input terminals of the phase-shift unit respectively. The first and second analog transmit signals to be supplied to the first and second mixers of the transmitter-side modulator respectively are produced in the phase-shift unit and output through first and second output terminals thereof. The first analog transmit signal arising at the first output terminal of the phase-shift unit, and the second analog transmit signal arising at the second output terminal are set to have a phase difference of 90° plus the predetermined transmit signal offset angle (see FIG. 11).

According to another preferable embodiment, the predetermined transmit signal offset angle can be set by analog signal processing by the phase-shift unit.

As a specific embodiment, an oscillating frequency of the transmitter-side oscillating output signal produced by the transmitter-side voltage-controlled oscillator is controlled by a phase lock loop including, in its closed loop, the transmitter-side voltage-controlled oscillator, an oscillation divider, a phase comparator and a low-pass filter.

In another specific embodiment, the sum of the predetermined local offset angle and predetermined transmit signal offset angle is substantially zero.

In another specific embodiment, the transmitter-side modulator, transmitter-side voltage-controlled oscillator, and transmitter-side divider constitute a transmitter according to one of a direct up-conversion transmitter architecture and a low-IF up-conversion transmitter architecture.

In another specific embodiment, the transmitter transmits the RF transmit signal having a frequency set within a range between about 1.7 and 2.0 GHz according to WCDMA system.

In the most specific embodiment, the receiver-side demodulator of the receiver, and the transmitter-side modulator, digital-to-analog converter, transmitter-side voltage-controlled oscillator, transmitter-side divider and phase-shift unit of the transmitter are arranged into a semiconductor chip.

As another most specific embodiment, the non-integral number of the dividing factor of the transmitter-side divider is set to a ratio of an odd number and an even number, or a ratio of different odd numbers.

[2] In view of another aspect of the invention, a transceiver according to a preferred embodiment has: a receiver including a receiver-side demodulator (1,2) for converting a received RF receive signal into an analog receive signal; and a transmitter including a transmitter-side modulator for converting an analog transmit signal into an RF transmit signal.

The receiver further includes a low-noise amplifier (85) for amplifying the RF receive signal, and a receiver-side voltage-controlled oscillator (4). Also, the receiver includes a receiver-side divider (3) for frequency-dividing a receiver-side oscillating output signal produced by the receiver-side voltage-controlled oscillator thereby to produce a first receiver-side local signal (φIRx-LO) and a second receiver-side local signal (φQRx-LO) to be supplied to the receiver-side demodulator. Further, the receiver includes an analog-to-digital converter (89I, 89Q) for converting an analog receive signal produced in the receiver-side demodulator and output through an output thereof into a digital receive signal.

The dividing factor of the receiver-side divider is set to a non-integral number larger than one. The receiver-side divider having the dividing factor set to the non-integral number is composed of a logic divider which performs a logic operation thereby to produce the first and second receiver-side local signals differing in phase.

The first and second receiver-side local signals produced by the receiver-side divider make a pair of non-quadrature local signals having a phase difference of 90° plus a predetermined local offset angle.

In the receiver-side demodulator of the receiver, mixing of an RF amplified receive signal from the low-noise amplifier and the pair of non-quadrature local signals from the receiver-side divider is performed.

The analog receive signal is formed of outputs of the receiver-side demodulator of the receiver according to non-quadrature demodulation as a result of the mixing.

The analog receive signal consists of a pair of non-quadrature receive signals having a phase difference of 90° plus a predetermined receive signal offset angle.

Figure 24:
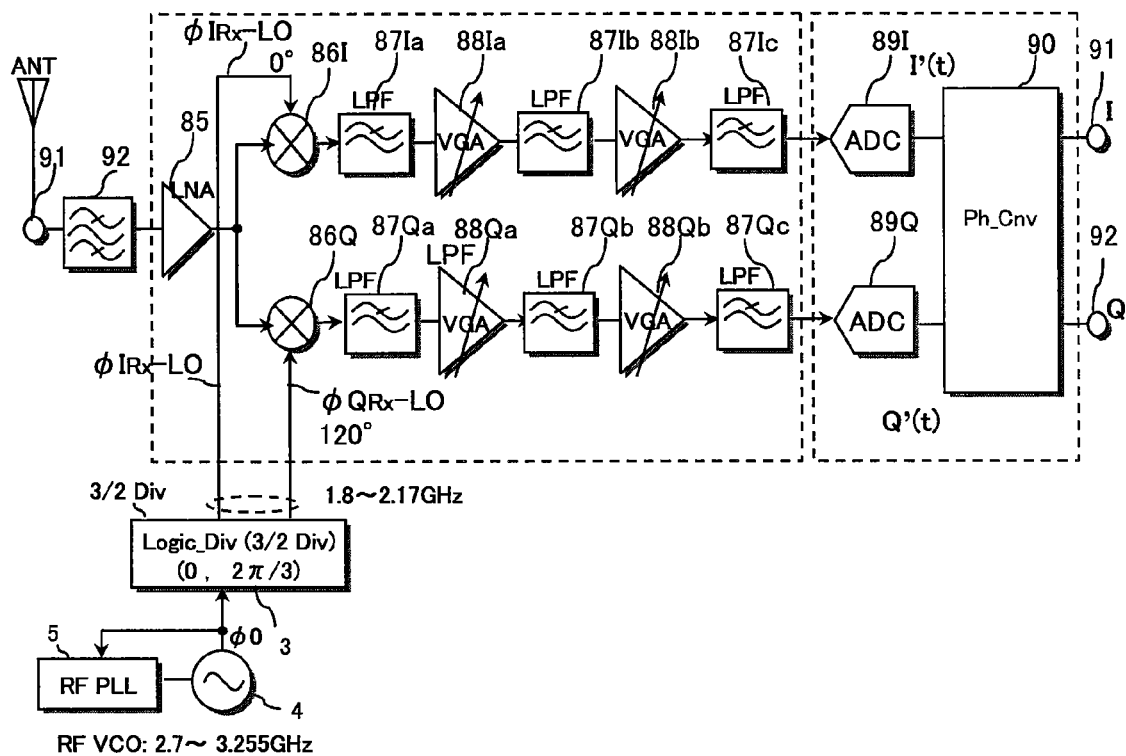
FIG. 24 is a diagram showing a primary portion of a DDC architecture-based receiver of a communication RF IC according to another embodiment of the invention, where DDC is an abbreviation of direct down-conversion.
Figure 26:
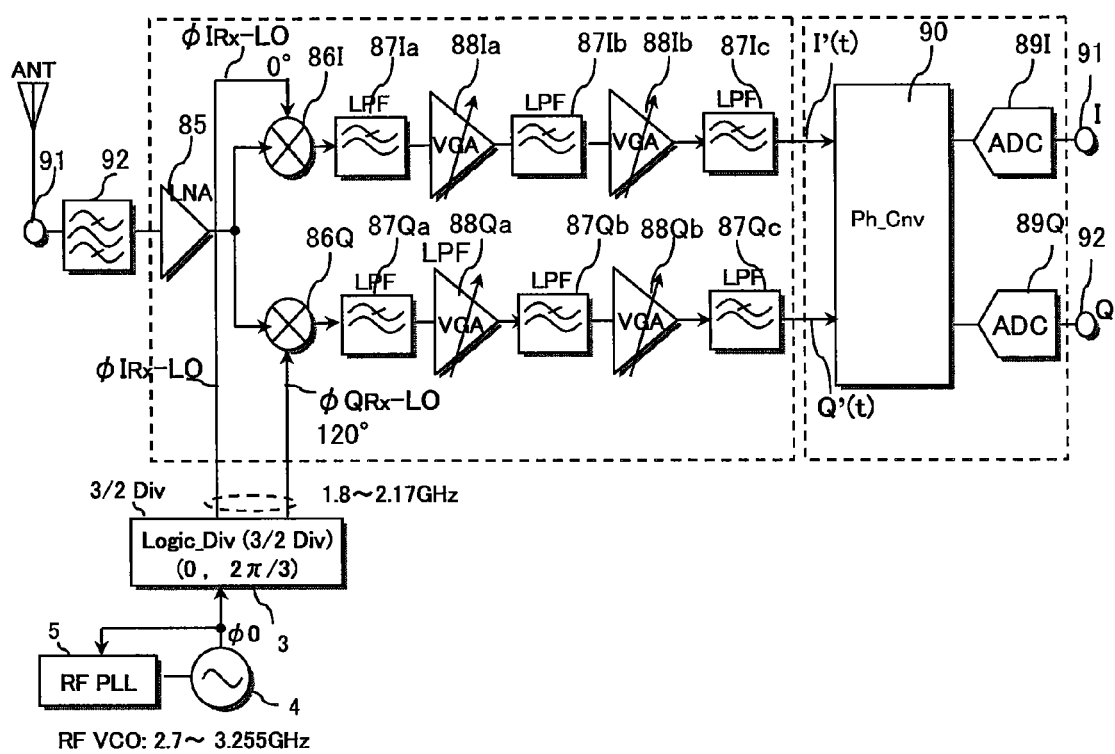
FIG. 26 is a diagram showing a primary portion of a DDC architecture-based receiver of a communication RF IC according to another embodiment of the invention.

The receiver further includes a phase-shift unit for converting the pair of non-quadrature receive signals into a pair of quadrature shifted receive signals having a phase difference of about 90° on an analog basis (see FIGS. 24 and 26).

According to the embodiment, the dividing factor of the receiver-side divider is set to a non-integral number, and thus it becomes possible to reduce the interference on a receiver-side local signal from the receiver-side divider by harmonics of the RF transmit signal. The receiver-side divider having the dividing factor set to the non-integral number is composed of a logic divider which performs a logic operation thereby to produce the first and second receiver-side local signals differing in phase. As a result, the amplitude of the first and second receiver-side local signals is made the full width between the source and ground voltages, and therefore the problems of the degradation of S/N ratio and the increase of EVM (error vector magnitude) as stated in JP-A-2003-152558 can be avoided. In addition, the analog signal phase difference on an analog basis can be created by digital signal processing by the phase-shift unit.

As a preferred embodiment, the receiver-side demodulator includes a first mixer and a second mixer. When the receiver-side oscillating output signal produced by the receiver-side voltage-controlled oscillator is supplied to the receiver-side divider, the receiver-side divider produces the first and second receiver-side local signals to be supplied to the first and second mixers respectively. The pair of non-quadrature receive signals is formed as the analog receive signal by outputs of the first and second mixers of the transmitter-side modulator supplied with the RF amplified receive signal from the low-noise amplifier.

As more preferable embodiment, the pair of non-quadrature receive signals as the analog receive signal includes first and second analog receive signals. The analog-to-digital converter includes a first analog-to-digital converter supplied with the first analog receive signal, and a second analog-to-digital converter supplied with the second analog receive signal. A first digital receive signal from an output of the first analog-to-digital converter, and a second digital receive signal from an output of the second analog-to-digital converter are supplied to first and second input terminals of the phase-shift unit respectively. The first and second digital receive signals from the analog-to-digital converter have a phase difference of 90° plus an offset angle substantially equal to the predetermined receive signal offset angle on an analog basis. First and second shifted digital receive signals produced in the phase-shift unit and respectively output through first and second output terminals thereof are set to have a phase difference of about 90° on an analog basis (see FIG. 24).

According to the above-described more preferable embodiment, the phase difference of about 90° can be set by digital signal processing by the phase-shift unit.

As another more preferable embodiment, the pair of non-quadrature receive signals as the analog receive signal includes first and second analog receive signals. The first and second analog receive signals are supplied to first and second input terminals of the phase-shift unit. The analog-to-digital converter includes a first analog-to-digital converter supplied with a first shifted analog receive signal from a first output terminal of the phase-shift unit, and a second analog-to-digital converter supplied with a second shifted analog receive signal from a second output terminal of the phase-shift unit. The first and second shifted analog receive signals produced in the phase-shift unit and respectively output through the first and second output terminals thereof are set to have a phase difference of about 90°. A first shifted digital receive signal produced by the first analog-to-digital converter, and a second shifted digital receive signal produced by the second analog-to-digital converter are set to have a phase difference of about 90° on an analog basis (see FIG. 26).

According to the above-described more preferable embodiment, the phase difference of about 90° can be set by analog signal processing by the phase-shift unit.

As a specific embodiment, an oscillating frequency of the receiver-side oscillating output signal produced by the receiver-side voltage-controlled oscillator is controlled by a phase lock loop including, in its closed loop, the receiver-side voltage-controlled oscillator, an oscillation divider, a phase comparator and a low-pass filter.

As another specific embodiment, the receiver-side demodulator, receiver-side voltage-controlled oscillator and receiver-side divider constitute a receiver according to one of a direct down-conversion receiver architecture, a low-IF down-conversion receiver architecture and a digital IF down-conversion receiver architecture.

As a still another specific embodiment, the receiver receives a WCDMA system RF receive signal with a frequency set between about 1.8 and 2.17 GHz.

As a further specific embodiment, the receiver-side demodulator, low-noise amplifier, receiver-side voltage-controlled oscillator, transmitter-side divider, analog-to-digital converter and phase-shift unit of the receiver, and the transmitter-side modulator of the transmitter are arranged into a semiconductor chip.

As a most specific embodiment, the non-integral number of the dividing factor of the receiver-side divider is set to a ratio of an odd number and an even number, or a ratio of different odd numbers.

2. Further Detailed Description of the Preferred Embodiments

Next, detailed descriptions of the embodiments will be presented. The best forms embodying the invention will be described below with reference to the drawings. Now, it is noted that as to all the drawings to which reference is made in describing the best forms embodying the invention, the members having identical functions are identified by the same reference numeral, and the repeated description thereof is avoided herein.

<<DUC Architecture-Based Transmitter of Communication RF IC>>

FIG. 10 is a diagram showing a DUC architecture-based transmitter of a communication RF IC according to an embodiment of the invention. The communication RF IC has a receiver which includes a receiver-side demodulator for converting a received RF receive signal into an analog receive signal, and a transmitter which includes a transmitter-side modulator for converting an analog transmit signal into an RF transmit signal. Also, the communication RF IC includes, in its semiconductor chip, a digital phase-shift unit 11, digital-to-analog converters 9 and 10, a pair of mixers 1 and 2 constituting a transmitter-side I/Q modulator, a logic divider 3, a transmitter-side voltage-controlled oscillator 4, and a transmitter-side RF PLL circuit 5. As for the transmitter as shown in FIG. 10, the dividing factor of the logic divider 3, which is connected between the transmitter-side voltage-controlled oscillator 4 and the pair of mixers 1 and 2 constituting the transmitter-side I/Q modulator, is set to not an integral number (e.g. 2) as in the prior art, but a non-integral number (i.e. a fractional number including a decimal), e.g. 3/2=1.5.

Therefore, the oscillating frequency of an oscillating output signal produced by the transmitter-side voltage-controlled oscillator 4, which ranges 2.55 to 3.0 GHz, is converted to the transmitter-side local signal frequency of a pair of transmitter-side local signals φITx-LO and φQTx-LO, which ranges 1.7 to 2.0 GHz. Also, the RF transmitter frequency of an RF transmit output signal, which is produced by the pair of mixers 1 and 2 constituting the transmitter-side I/Q modulator, an adder 8a, a variable amplifier 8b, a band-pass filter 12, and an RF power amplifier 13 and output through a transmitter output terminal 14 of the transmitter, is made a frequency ranging 1.7 to 2.0 GHz. Hence, the frequency of the second harmonic with respect to the RF transmitter frequency ranges 3.4 to 4.0 GHz, and the frequency of the third harmonic with respect to the RF transmitter frequency ranges 5.1 to 6.0 GHz. Signals consisting of the second and third harmonics having such high frequencies cannot cause an injection lock phenomenon.

The logic divider 3 having a dividing factor set to a non-integral number (i.e. a fractional number) such as 3/2=1.5 performs a logic operation thereby to produce a pair of transmitter-side local signals φITx-LO and φQTx-LO differing in phase. The simplest way to realize a frequency-division by 1.5 by means of a logic operation includes to set the duty ratio to 33.33 percent and set the phase difference to 120° (2π/3) so that the pair of transmitter-side local signals φITx-LO and φQTx-LO is made High level in a period of 0.5 and Low level in a period of 1.0 (see a waveform illustration drawn on the right of the divider 3). The amplitude of the pair of transmitter-side local signals φITx-LO and φQTx-LO is made the full width between the source and ground voltages, and therefore the problems of the degradation of S/N ratio and the increase of EVM (error vector magnitude) as stated in JP-A-2003-152558 can be avoided.

When the dividing factor of the logic divider 3 set to a non-integral number larger than one (1) is represented by N, the local signal phase difference between the first transmitter-side local signal φITx-LO and the second transmitter-side local signal φQTx-LO is represented by π/N. In the case of N=1.5 as in the example of the transmitter as shown in FIG. 10, the local signal phase difference is derived as follows: 180°/1.5=120°. It is common for quadrature modulation that the local signal phase difference between the first transmitter-side local signal and the second transmitter-side local signal is 90°. However, in this case, the local signal phase difference between the first and second transmitter-side local signals φITx-LO and φQTx-LO is 120° involving local offset angles of 90° and +30°.

Consequently, the paired transmitter-side local signals φITx-LO and φQTx-LO supplied to one input terminals of the pair of mixers 1 and 2 constituting the transmitter-side I/Q modulator by the logic divider 3 with its dividing factor N set to a non-integral number of 1.5 have therebetween a phase difference of not 90° (π/2) as in conventional cases, but 120° (2π/3). The pair of transmitter-side local signals φITx-LO and φQTx-LO having a phase difference of 120° (2π/3) like this is formed by the logic divider 3, transmitter-side voltage-controlled oscillator 4 and RF phase-locked loop circuit 5. The transmitter-side voltage-controlled oscillator 4 oscillates e.g. at a stable frequency ranging 2.55 to 3.0 GHz under the control of the RF phase-locked loop circuit 5. The divider 3 implements a dividing operation with a dividing factor of 3/2 (i.e. 1.5) in response to an oscillating output signal φ0 from the transmitter-side voltage-controlled oscillator 4. Thus, a pair of transmitter-side local signals φITx-LO(17) and φQTx-LO(18) having a cycle substantially 1.5 times the cycle of the oscillating output signal φ0 from the transmitter-side voltage-controlled oscillator 4 is produced and launched from outputs of the divider 3. As shown in the waveform illustration drawn on the right of the divider 3, the paired transmitter-side local signals φITx-LO(17) and φQTx-LO(18) have a phase difference of 120° (2π/3). Also, as shown in a lower portion of FIG. 10, the transmitter-side local signal φITx-LO on the I-axis and the transmitter-side local signal φQTx-LO(18) having an angle of +30° with respect to the Q-axis have a phase difference of 120° (2π/3) therebetween.

Meanwhile, to perform an accurate quadrature modulation by use of the pair of mixers 1 and 2 constituting the transmitter-side I/Q modulator, analog baseband transmit signals I' and Q' supplied to the other input terminals of the paired mixers 1 and 2 have a phase difference of not 90° (π/2) as in conventional cases, but 60° (π/3) therebetween. As shown in the lower portion of FIG. 10, the analog baseband transmit signal I' on the I-axis, and the analog baseband transmit signal Q' having an angle of −30° with respect to the Q-axis have a phase difference of 60° (π/3) therebetween. In other words, the analog signal phase difference between the first analog transmit signal I' and second analog transmit signal Q', which are supplied to the first mixer 1 and second mixer 2 respectively, involves analog offset angles of 90° and −30°. In addition, the sum of the local offset angle of +30° and the analog offset angle of −30° is zero.

Thus, in one mixer, i.e. mixer 1, an analog multiplication signal I'·φITx-LO on the I-axis is formed by analog multiplication of the analog baseband transmit signal I' on the I-axis and the transmitter-side local signal φITx-LO on the I-axis. Further, in the other mixer 2, an analog multiplication signal Q'·φQTx-LO on the Q-axis is formed by analog multiplication of the analog baseband transmit signal Q' having an angle of −30° with respect to the Q-axis, and the transmitter-side local signal φQTx-LO having an angle of +30° with respect to the Q-axis. Hence, the analog multiplication signal I'·φITx-LO on the I axis, which comes from the one mixer 1, and the analog multiplication signal Q'·φQTx-LO on the Q-axis, which comes from the other mixer 2 have therebetween a phase difference of 90° (π/2) exactly, and therefore it becomes possible to perform an accurate quadrature modulation.

The transmitter-side voltage-controlled oscillator 4 oscillates at a stable frequency ranging 2.55 to 3.0 GHz, and in parallel the divider 3 implements a dividing operation with a dividing factor of 3/2 (=1.5), and thus the RF frequency of an RF transmit signal RF_TX resulting from combination of outputs of the pair of mixers 1 and 2 by the adder 8a falls between 1.7 and 2.0 GHz. The RF transmit signal resulting from the combination by the adder 8a is amplified by the variable-gain amplifier 8b, made to pass through the band-pass filter 12, and then amplified by the RF power amplifier 13 outside the RF IC chip. In this way, an RF transmit output signal is supplied to a transmitting antenna from the output terminal 14 of the DUC architecture-based transmitter. Now, the following is recommended for the band-pass filter 12.

That is, the band-pass filter 12 has a transmission property such that waveform distortion owing to the dividing operation by the divider 3 using the dividing factor of 3/2 (=1.5) is suppressed.

The frequency of an RF transmit output signal launched from the output terminal 14 of the transmitter is set to be a non-integer multiple of the oscillating frequency of the transmitter-side voltage-controlled oscillator 4. As a result, it becomes possible to avoid the occurrence of the injection lock phenomenon that the oscillating frequency of the transmitter-side voltage-controlled oscillator 4 is locked by fundamental wave components and second and third harmonic components of an RF transmit output signal launched from the output terminal 14 of the transmitter.

Figure 7:
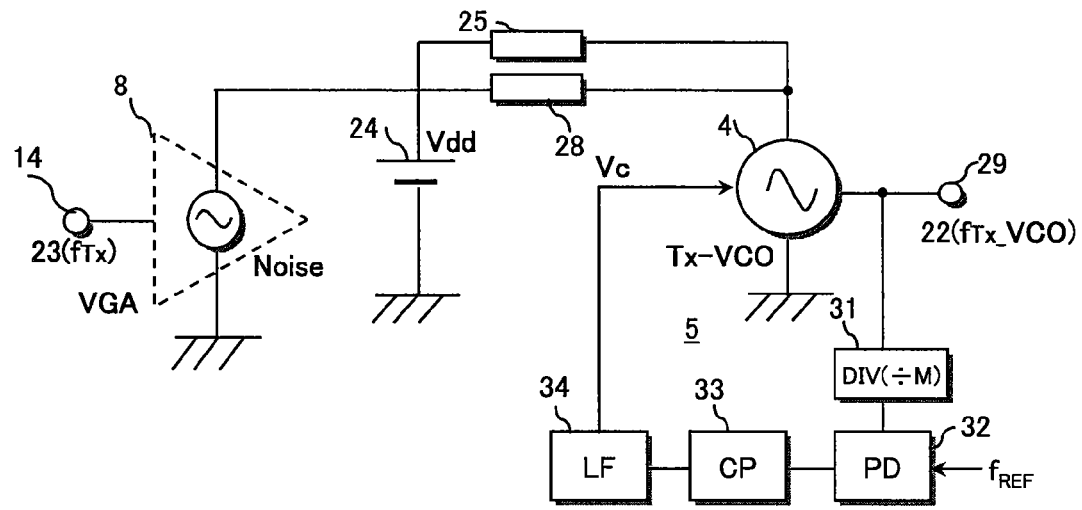
FIG. 7 is a diagram for more specifically explaining a mechanism of occurrence of an injection lock phenomenon in the communication RF IC as shown in FIG. 3.
Figure 8:
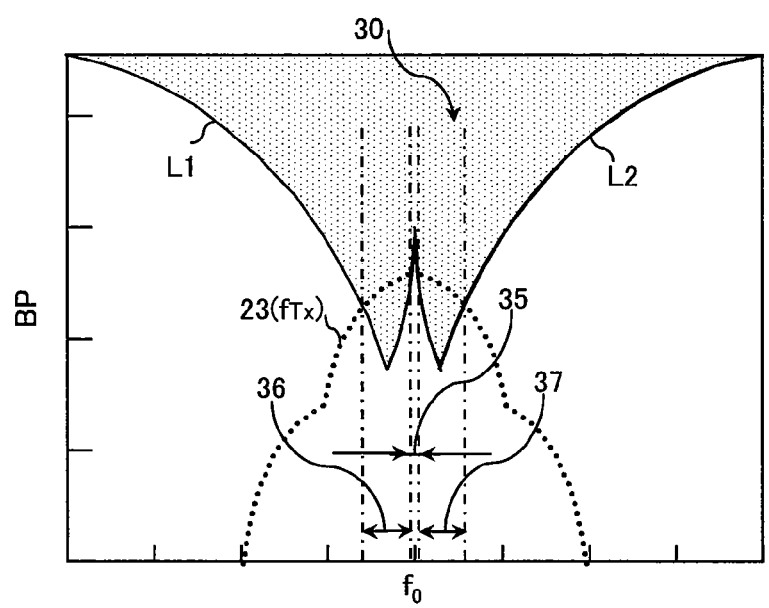
FIG. 8 is an illustration for more specifically explaining the feature of an injection lock phenomenon occurring in the communication RF IC as shown in FIG. 3.
Figure 9:
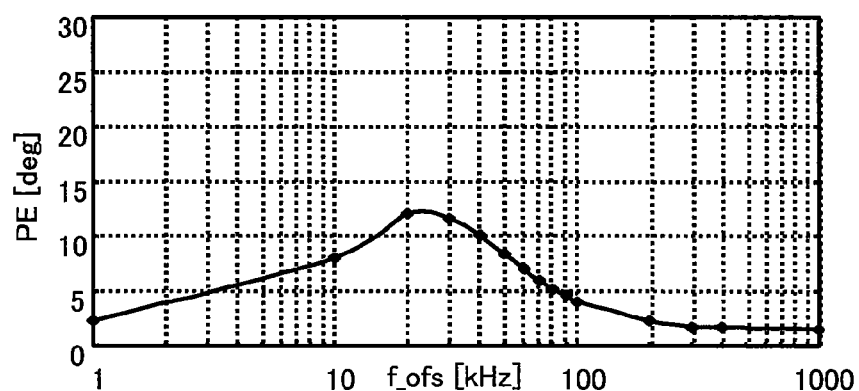
FIG. 9 is a graph showing an effect of disturbance on a frequency region near the PLL lock frequency $f_0$ in the communication RF IC as shown in FIG. 3.

Even in the transmitter as shown in FIG. 10, the oscillating frequency f0 of the transmitter-side voltage-controlled oscillator 4 is controlled by an RF phase-lock loop 5 including the divider 31, the phase comparator 32, the charge pump circuit 33 and the low-pass filter 34 as shown in FIG. 7. When the transmitter as shown in FIG. 10 is adopted, the occurrence of an injection lock phenomenon can be avoided not only in the center portion 35 of the PLL lock frequency f0 as shown in FIG. 8, but also both in the low-frequency region 36 below the center portion 35 and the high-frequency region 37 above it. Now, it is noted for the RF phase-lock loop 5 as shown in FIG. 7 that when the reference frequency $f_{REF}$ of a system-reference oscillator, which is to be supplied to the other input terminal of the phase comparator 32, is set to 26. 0 MHz, and the dividing factor M of the divider 31 is set to 10.196, the oscillating frequency f0 of the transmitter-side voltage-controlled oscillator 4 can be made 2.55 MHz. In addition, when the dividing factor M of the divider 31 is set to 8.667, the oscillating frequency f0 of the transmitter-side voltage-controlled oscillator 4 can be made 3.00 MHz. When the divider 31 having a dividing factor M including an integral number as well as a decimal is constituted by a ΔΣ modulator, the RF phase-lock loop 5 as shown in FIG. 7 makes a ΔΣ fractional PLL circuit. Now, it is noted that the system-reference oscillator includes a quartz oscillator, and produces a stable and accurate reference frequency $f_{REF}$ of 26.0 MHz in response to supply of an AFC (automatic frequency control signal) from a baseband signal-processing unit.

<<Digital Phase-Shift Unit>>

In regard to the transmitter as shown in FIG. 10, the analog phase difference of 60° (π/3) between the analog baseband transmit signal I' and analog baseband transmit signal Q' is produced by the digital phase-shift unit 11 effectively. Digital baseband transmit signals I and Q from a digital baseband signal-processing unit such as a digital baseband signal-processing LSI (not shown) are supplied to input terminals 15b and 16b of the digital phase-shift unit 11. The two digital baseband transmit signals I and Q have digital values and a phase difference of 90° (π/2) on an analog basis. In response to digital baseband transmit signals I and Q, the digital phase-shift unit 11 produces two phase-shifted digital baseband transmit signals having a phase difference of 60° (π/3) on an analog basis. The two phase-shifted digital baseband transmit signals are converted into analog signals by the digital-to-analog converters 9 and 10, whereby the analog baseband transmit signals I' and Q' having a phase difference of 60° (π/3) can be produced.

<<Transmitter including Analog Phase-Shift Unit>>

FIG. 11 is a diagram showing a primary portion of a DUC architecture-based transmitter of a communication RF IC according to another embodiment of the invention. As shown in FIG. 11, digital baseband transmit signals I(t) and Q(t) having a phase difference of 90° (π/2) on an analog basis are supplied to input terminals 15b and 16b of digital-to-analog converters 9 and 10. Then, analog baseband transmit signals launched from outputs of the digital-to-analog converters 9 and 10 are supplied to input terminals 15 and 16 of an analog phase-shift unit 11. The analog phase-shift unit 11 executes a matrix operation on the analog baseband transmit signals (I(t) and Q(t)) thus supplied using the matrix as described below. Thus, two phase-shifted analog baseband transmit signals I'(t) and Q'(t) arise at output terminals 19 and 20 of the analog phase-shift unit 11.

$$\begin{pmatrix} I'(t) \\ Q'(t) \end{pmatrix} = \begin{bmatrix} 1 & \tan(\frac{\pi}{6}) \\ 0 & \frac{1}{\cos(\frac{\pi}{6})} \end{bmatrix} \times \begin{pmatrix} I(t) \\ Q(t) \end{pmatrix}$$

One mixer 1 constituting a transmitter-side I/Q modulator executes an analog multiplication of one phase-shifted analog baseband transmit signal I'(t)=I(t)+tan (π/6)·Q(t) and one transmitter-side local signal φITx–LO=cos (ωt). The other mixer 2 performs an analog multiplication of the other phase-shifted analog baseband transmit signal Q' (t)=Q(t)/ cos (π/6) and the other transmitter-side local signal φQTx–LO=sin (ωt−(π/6)). The transmitter-side local signals φITx–LO and φQTx–LO have a phase difference of 120° (2π/3), and the phase-shifted analog baseband transmit signals I' (t) and Q' (t) have a phase difference of 60° (π/3). As a result, an accurate quadrature modulation output signal $S_{OUT}$ can be obtained from an adder 8a connected with outputs of the mixers 1 and 2.

<<Logic Divider>>

Figure 12:
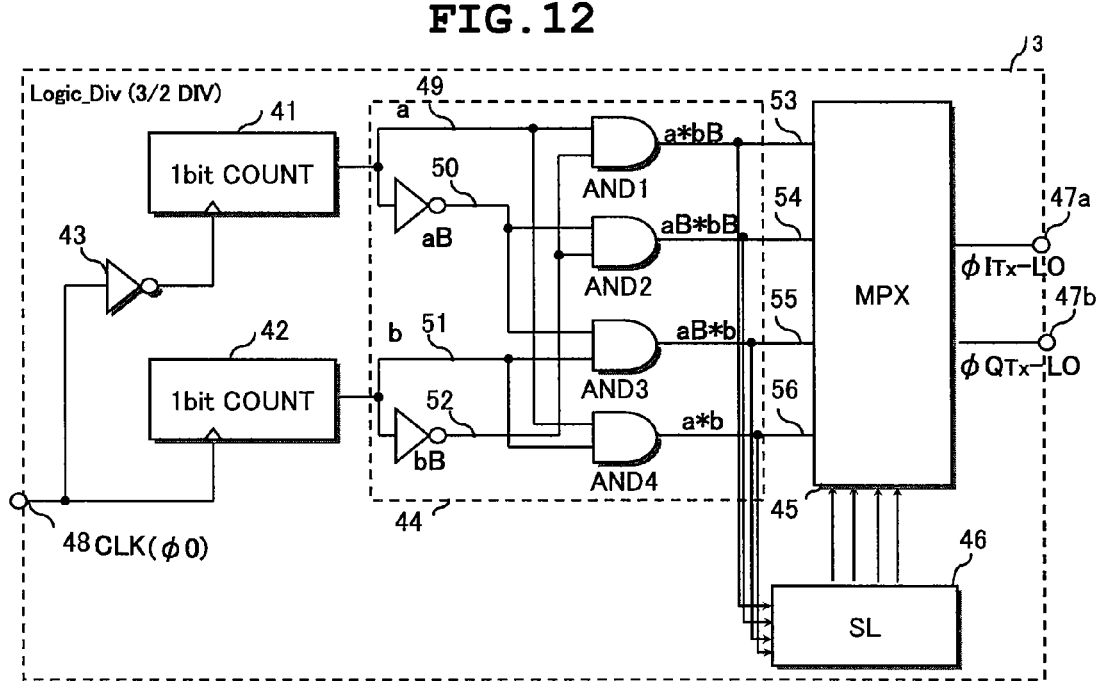
FIG. 12 is a diagram showing a configuration of a logic divider which is included in the DUC architecture-based transmitter as shown in FIG. 10, and has a dividing factor set to a non-integral number.

FIG. 12 is a diagram showing a configuration of the logic divider 3 which is included in the DUC architecture-based transmitter of the communication RF IC according to the embodiment of the invention shown in FIG. 10 and has a dividing factor set to a non-integral number (i.e. a fractional number). To an input terminal 48 thereof, a clock signal CLK is supplied as the oscillating output signal φ0 from the transmitter-side voltage-controlled oscillator 4. The clock signal having come to the input terminal 48 is directly supplied to a trigger input terminal of a 2-divider 42 composed of a 1-bit counter, and in parallel, supplied to a trigger input terminal of a 2-divider 41 composed of a 1-bit counter through an inverter 43. The 2-dividers 41 and 42 respond to only negative edges supplied to the trigger input terminals without responding to positive edges, to invert their output states, and execute a dividing operation with a dividing factor of 2. The 2-dividers 41 and 42 form output signals a and b having a phase difference of 120° (2π/3), from which two inverters subsequent to the 2-dividers form inverted signals aB and bB. The output signals a and b and inverted signals aB and bB are supplied to four AND circuits AND1 to AND4. From outputs of the four AND circuits AND1 to AND4, logical signals a*bB, aB*bB, aB*b, and a*b are produced. The four logical signals are supplied to multiplexer 45 and select logic 46, and then 4-bit select signals to be supplied from the select logic 46 to the multiplexer 45 are formed. In other words, the select logic 46 is a state machine, which selects input signals to be input to the multiplexer 45 according to the changes in complicated combinations of logic levels of logical signals a*bB, aB*bB, aB*b, and a*b.

Figure 13:
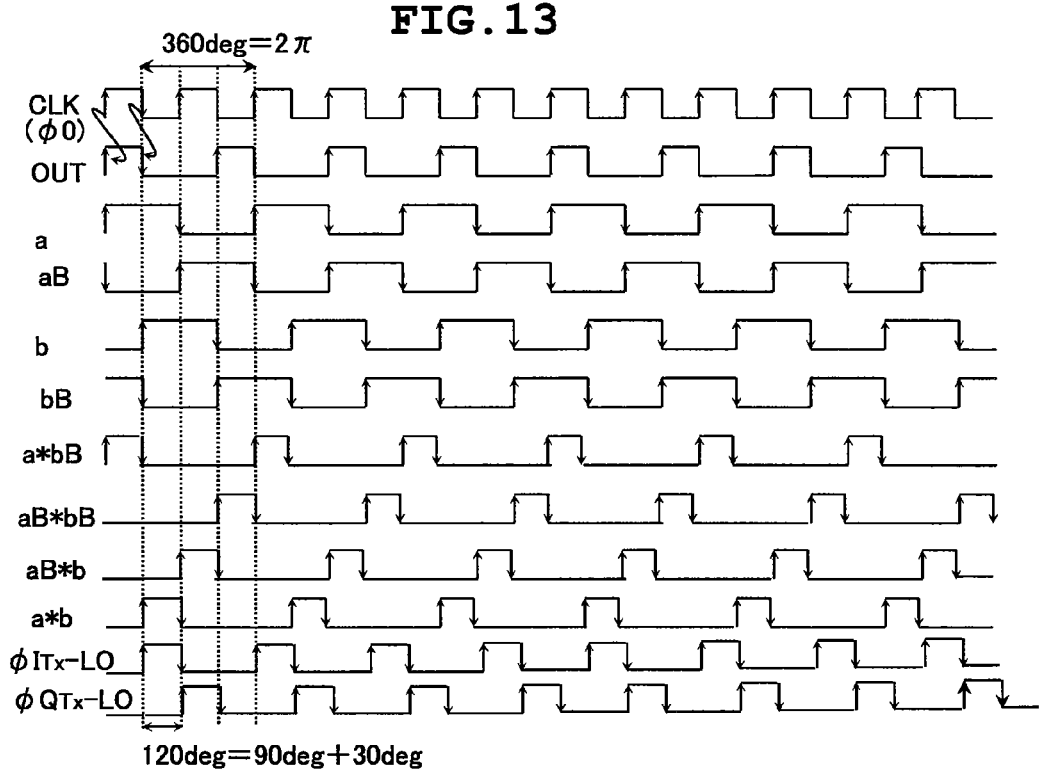
FIG. 13 is a time chart showing waveforms in the logic divider as shown in FIG. 12.

FIG. 13 is a time chart showing waveforms in the logic divider 3 as shown in FIG. 12. A pair of transmitter-side local signals φItx–LO(17) and φQTx–LO(18) having a phase difference of 120° (2π/3) are produced and output through output terminals 47a and 47b of the logic divider 3.

Figure 14:
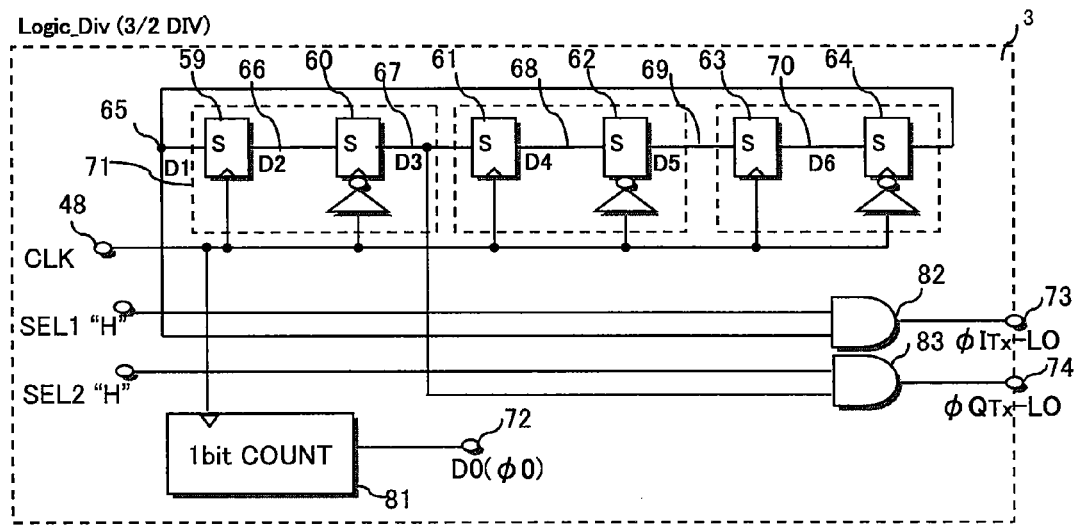
FIG. 14 is a diagram showing another configuration of the logic divider which is included in the DUC architecture-based transmitter as shown in FIG. 10 and has a dividing factor set to a non-integral number.

FIG. 14 is a diagram showing another configuration of the logic divider 3 which is included in the DUC architecture-based transmitter of the communication RF IC according to the embodiment of the invention shown in FIG. 10 and has a dividing factor set to a non-integral number (i.e. a fractional number). To the input terminal 48 shown in FIG. 14, a clock signal CLK, which is a signal twice the frequency of an oscillating output signal φ0 launched from the transmitter-side voltage-controlled oscillator 4, is supplied. The logic divider 3 as shown in FIG. 14 includes a counter formed by connecting six delay-type flip-flops (FF) 59 to 64 in a loop. Herein, the term "flip-flop" is sometimes abbreviated to "FF". The six delay-type FF 59 to 64 each latch therein an input signal supplied to their sampling input terminals S in response to a negative edge supplied to their trigger input terminals. A positive edge of the clock signal CLK is supplied to a trigger input terminal of each of the first, third and fifth delay-type FFs 59, 61 and 63, whereas to a trigger input terminal of each of the second, fourth and sixth delay-type FFs 60, 62 and 64, a positive edge of an inverted clock signal CLKB resulting from inversion by the corresponding inverter is supplied.

The clock signal entered through the input terminal 48 is directly supplied to a trigger input terminal of a 2-divider 81 composed of a 1-bit counter. Then, an output signal D0 resulting from frequency-division of the clock signal CLK by 2 is produced in the 2-divider 81 and output through an output terminal 72 thereof. The output signal D0 resulting from frequency-division by 2 can be used as the oscillating output signal φ0 of the transmitter-side voltage-controlled oscillator 4 of the communication RF IC as shown in FIG. 10. To input terminals of an AND circuit 82, a select signal SEL1 of High level and an input signal D1 to the first delay-type FF 59 are supplied respectively. To input terminals of an AND circuit 83, a select signal SEL2 of High level and an input signal D3 to the third delay-type FF 61 are supplied respectively.

Figure 15:
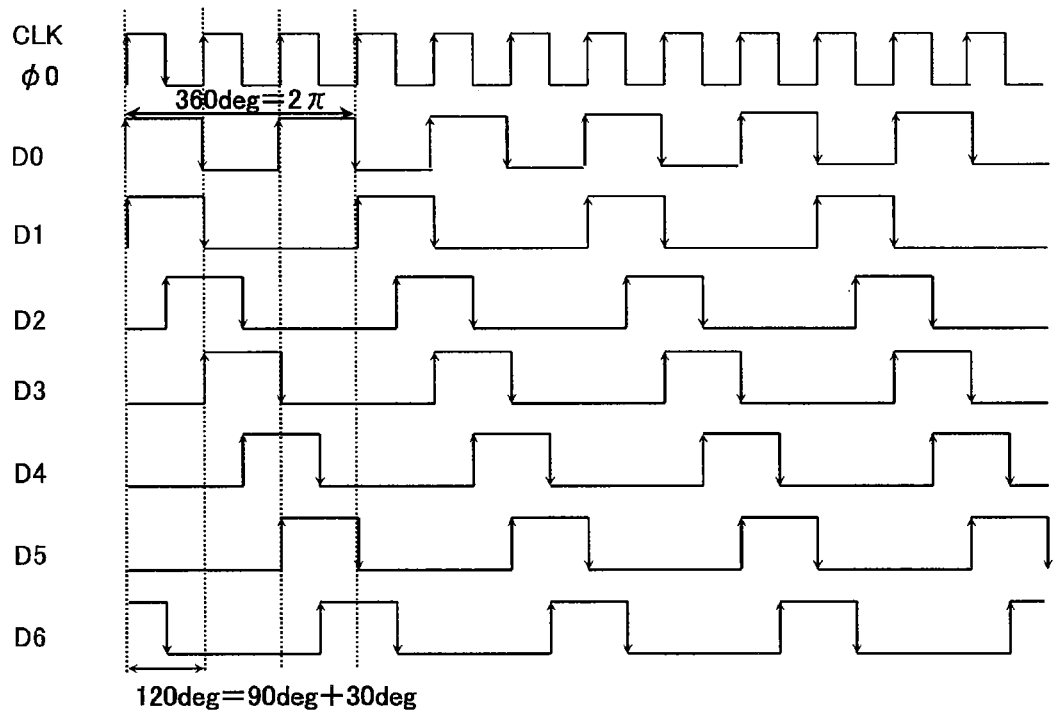
FIG. 15 is a time chart showing waveforms in the logic divider as shown in FIG. 14.

FIG. 15 is a time chart showing waveforms in the logic divider 3 as shown in FIG. 14. With the aid of the AND circuits 82 and 83, the input signals D1 and D3 can be output as a pair of transmitter-side local signals φItx–LO(17) and φQTx–LO(18) having a phase difference of 120° (2π/3).

<<Transmitter Including Another Analog Phase-Shift Unit>>

Figure 16:
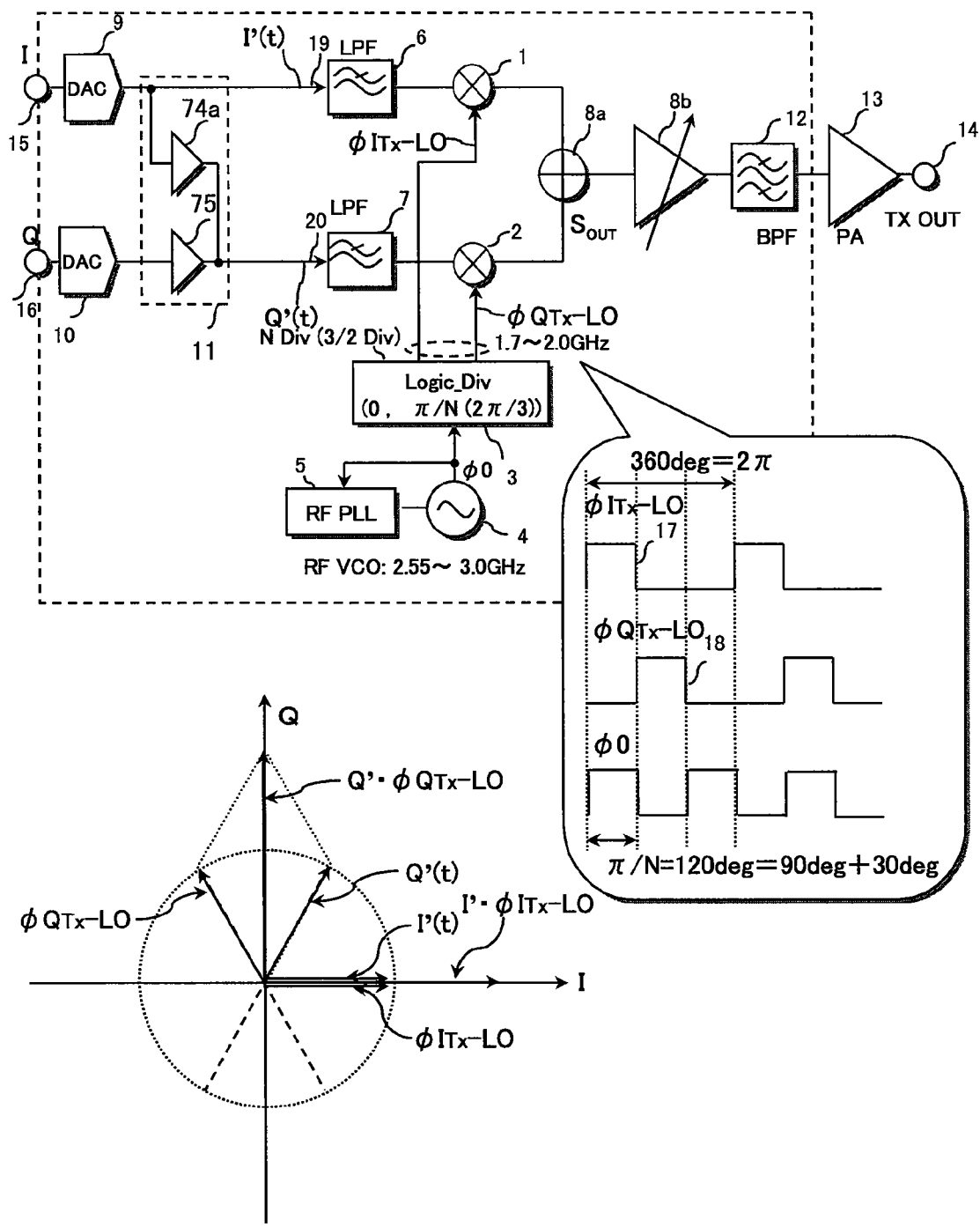
FIG. 16 is a diagram showing a primary portion of a DUC architecture-based transmitter of a communication RF IC according to another embodiment of the invention.

FIG. 16 is a diagram showing a primary portion of a DUC architecture-based transmitter of a communication RF IC according to another embodiment of the invention. In the transmitter as shown in FIG. 16, digital baseband transmit signals I and Q supplied to input terminals 15 and 16 have digital values and a phase difference of 90° (π/2) on an analog basis. As digital-to-analog converters 9 and 10 convert the digital baseband transmit signals I and Q into analog signals, the resultant analog baseband signals I and Q having a phase difference of 90° (π/2) are supplied to an analog phase-shift unit 11. The analog phase-shift unit 11 includes a first analog amplifier 74a with an input connected with an analog output of the digital-to-analog converter 9, and a second analog amplifier 75 with an input connected with an analog output of the digital-to-analog converter 10. An analog output from the digital-to-analog converter 9 is directly supplied to an input of a low-pass filter 6 as a phase-shifted analog baseband transmit signal I' (t). On the side of output terminals of the first and second analog amplifiers 74a and 75 of the analog phase-shift unit 11, analog signals corresponding to the digital baseband transmit signals I and Q are combined, whereby a phase-shifted analog baseband transmit signal Q' (t) is produced. As shown in a lower portion of FIG. 10, the phase-shifted analog baseband transmit signal Q' (t) has a phase difference corresponding to an angle of –30° with respect to the Q-axis.

Further, in the transmitter as shown in FIG. 16, the divider 3 executes a dividing operation with a dividing factor of 3/2 (=1.5) in response to an oscillating output signal φ0 from the transmitter-side voltage-controlled oscillator 4 as in the transmitter as shown in FIG. 10. Thus, the divider 3 produces a pair of transmitter-side local signals φITx–LO(17) and φQTx–LO (18) about 1.5 times the frequency of the oscillating output signal φ0 from the transmitter-side voltage-controlled oscillator 4, and the paired signals are output through outputs of the divider. As shown in a waveform illustration drawn on the right of the divider 3, the pair of transmitter-side local signals φITx–LO(17) and φQTx–LO(18) has a phase difference of 120° (2π/3). Further, as shown in the lower portion of FIG. 16, the transmitter-side local signal φITx–LO(17) on the I-axis and the transmitter-side local signal φQTx–LO(18) having an angle of +30° with respect to the Q-axis have a phase difference of 120° (2π/3).

To perform an accurate quadrature modulation by use of the pair of mixers 1 and 2 constituting the transmitter-side I/Q modulator, the phase-shifted analog baseband transmit signals I' (t) and Q' (t) supplied to the other input terminals of the paired mixers 1 and 2 have a phase difference of 60° (π/3) therebetween. That is, as shown in the lower portion of FIG. 16, the phase-shifted analog baseband transmit signal I' (t) on the I-axis and the phase-shifted analog baseband transmit signal Q' (t) having an angle of –30° with respect to the Q-axis have a phase difference of 60° (π/3) therebetween.

Hence, as in the transmitter as shown in FIG. 10, also in the transmitter as shown in FIG. 16, the analog multiplication signal I'·φITx–LO on the I-axis, which comes from the one mixer 1, and the analog multiplication signal Q'·φQTx–LO on the Q-axis, which comes from the other mixer 2, have therebetween a phase difference of 90° (π/2) exactly, and therefore it becomes possible to perform an accurate quadrature modulation.

<<Transmitter including a Divider with another Dividing Factor>>

Figure 17:
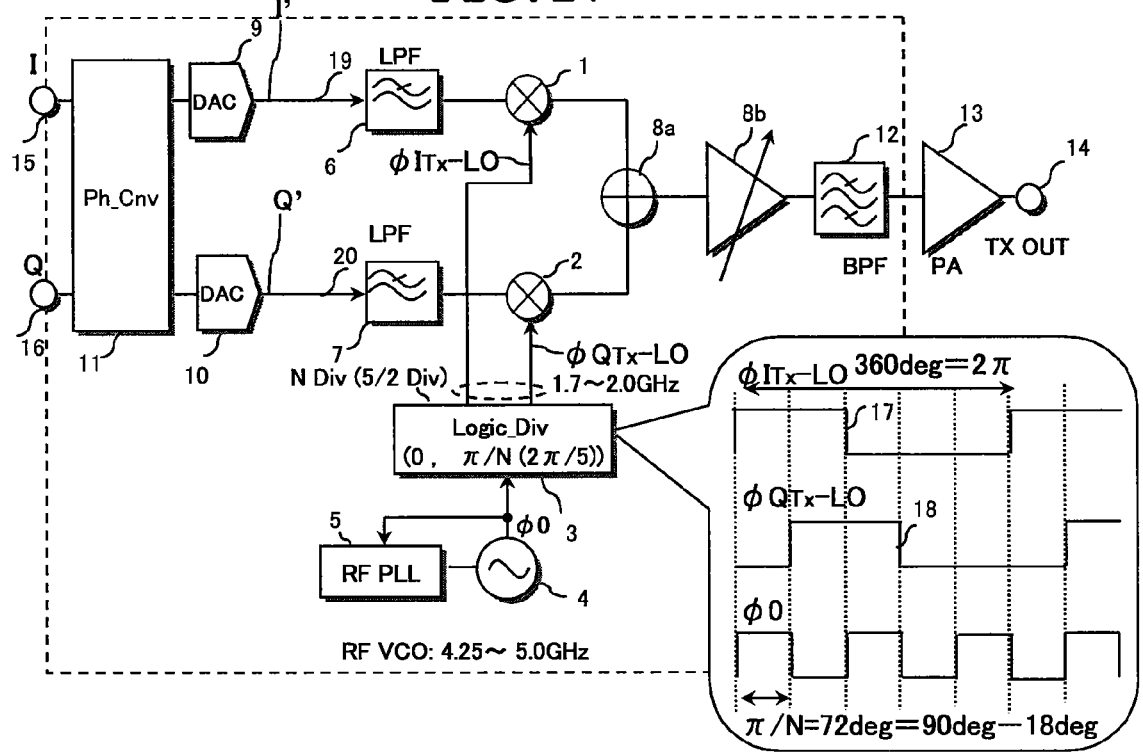
FIG. 17 is a diagram showing a primary portion of a DUC architecture-based transmitter of a communication RF IC according to another embodiment of the invention.
Figure 17:
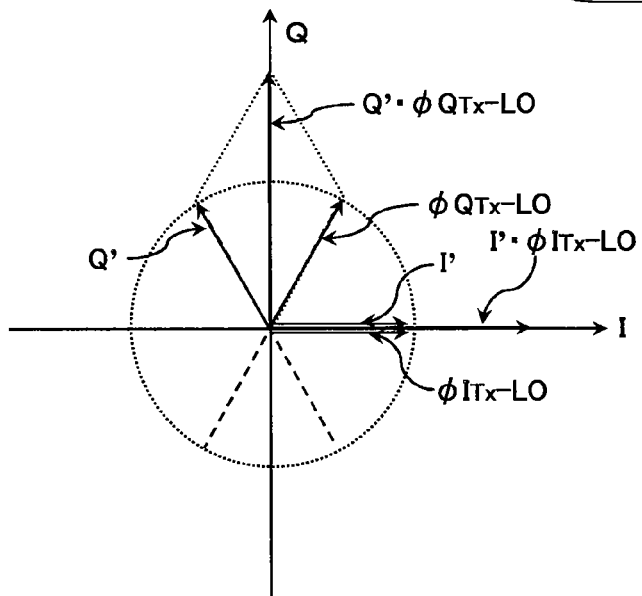

FIG. 17 is a diagram showing a primary portion of a DUC architecture-based transmitter of a communication RF IC according to another embodiment of the invention. Unlike the transmitter as shown in FIG. 10, a divider 3 of the transmitter as shown in FIG. 17 executes a dividing operation in the condition where the dividing factor N of a non-integral number is 5/2 (=2.5). Therefore, the oscillating frequency of an oscillating output signal produced by the transmitter-side voltage-controlled oscillator 4, which ranges 4.25 to 5.0 GHz, is converted to the transmitter-side local signal frequency of a pair of transmitter-side local signals φITx-LO and φQTx-LO, which ranges 1.7 to 2.0 GHz. Also, the RF transmitter frequency of an RF transmit output signal, which is produced by a pair of mixers 1 and 2 constituting a transmitter-side I/Q modulator, an adder 8a, a variable amplifier 8b, a band-pass filter 12, and an RF power amplifier 13, and output through a transmitter output terminal 14 of the transmitter, becomes a frequency ranging 1.7 to 2.0 GHz. Hence, the frequency of the second harmonic with respect to the RF transmitter frequency ranges 3.4 to 4.0 GHz, and the frequency of the third harmonic with respect to the RF transmitter frequency ranges 5.1 to 6.0 GHz. Signals consisting of the second and third harmonics having such high frequencies cannot cause an injection lock phenomenon.

Now, the logic divider 3 having a dividing factor N set to a non-integral number (i.e. a fractional number) such as 5/2=2.5 performs a logic operation thereby to produce a pair of transmitter-side local signals φITx–LO and φQTx–LO differing in phase. The simplest way to realize a frequency-division by 2.5 by means of a logic operation includes to set the duty ratio to 40 percent and set the phase difference to 72° (π/N=2π/5) so that the pair of transmitter-side local signals φITx–LO and φQTx–LO is made High level in a period of 0.4 and Low level in a period of 0.6 (see a waveform illustration drawn on the right of the divider 3). As a result, the amplitude of the pair of transmitter-side local signals φITx–LO and φQTx–LO becomes the full width between the source and ground voltages, and therefore the problems of the degradation of S/N ratio and the increase of EVM (error vector magnitude) as stated in JP-A-2003-152558 can be avoided.

Consequently, the paired transmitter-side local signals φITx–LO and φQTx–LO supplied to one input terminals of the pair of mixers 1 and 2 constituting the transmitter-side I/Q modulator by the logic divider 3 have therebetween a phase difference of not 90° (π/2) as in conventional cases, but 72° (2π/5). The pair of transmitter-side local signals φITx–LO and φQTx–LO having a phase difference of 72° (2π/5) like this is formed by the logic divider 3, transmitter-side voltage-controlled oscillator 4 and RF phase-locked loop circuit 5. The transmitter-side voltage-controlled oscillator 4 oscillates e.g. at a stable frequency ranging 4.25 to 5.0 GHz under the control of the RF phase-locked loop circuit 5. The divider 3 implements a dividing operation with a dividing factor of 5/2 (i.e. 2.5) in response to an oscillating output signal φ0 from the transmitter-side voltage-controlled oscillator 4. Thus, a pair of transmitter-side local signals φITx–LO(17) and φQTx–LO(18) having a cycle substantially 2.5 times the cycle of the oscillating output signal φ0 from the transmitter-side voltage-controlled oscillator 4 is produced and launched from outputs of the divider 3. As shown in the waveform illustration drawn on the right of the divider 3, the paired transmitter-side local signals φITx–LO(17) and φQTx–LO (18) have a phase difference of 72° (2π/5). Also, as shown in a lower portion of FIG. 17, the transmitter-side local signal φITx–LO on the I-axis and the transmitter-side local signal φQTx–LO(18) having an angle of –18° with respect to the Q-axis have a phase difference of 72° (2π/5) therebetween.

Meanwhile, to perform an accurate quadrature modulation by use of the pair of mixers 1 and 2 constituting the transmitter-side I/Q modulator, analog baseband transmit signals I' and Q' supplied to the other input terminals of the paired mixers 1 and 2 have a phase difference of not 90° (π/2) as in conventional cases, but 108° (3π/5) therebetween. As shown in the lower portion of FIG. 17, the analog baseband transmit signal I' on the I-axis, and the analog baseband transmit signal Q' having an angle of +18° with respect to the Q-axis have a phase difference of 108° (3π/5) therebetween.

Thus, in one mixer, i.e. mixer 1, an analog multiplication signal I'·φITx–LO on the I-axis is formed by analog multiplication of the analog baseband transmit signal I' on the I-axis and the transmitter-side local signal φITx–LO on the I-axis. Further, in the other mixer 2, an analog multiplication signal Q'·φQTx–LO on the Q-axis is formed by analog multiplication of the analog baseband transmit signal Q' having an angle of +18° with respect to the Q-axis, and the transmitter-side local signal φQTx–LO having an angle of –18° with respect to the Q-axis. Hence, the analog multiplication signal I'·φITx–LO on the I axis, which comes from the one mixer 1, and the analog multiplication signal Q'·φQTx–LO on the Q-axis, which comes from the other mixer 2 have therebetween a phase difference of 90° (π/2) exactly, and therefore it becomes possible to perform an accurate quadrature modulation.

<<Other Digital Phase-Shift Unit>>

In the transmitter as shown in FIG. 17, the phase difference of 108° (3π/5) between the analog baseband transmit signals I' and Q' is produced by the digital phase-shift unit 11 as shown in FIG. 17. Digital baseband transmit signals I and Q from a digital baseband signal-processing unit such as a digital baseband signal-processing LSI (not shown) are supplied to input terminals 15 and 16 of the digital phase-shift unit 11. The two digital baseband transmit signals I and Q have digital values and a phase difference of 90° (π/2) on an analog basis. In response to digital baseband transmit signals I and Q, the digital phase-shift unit 11 produces two phase-shifted digital baseband transmit signals having a phase difference of 108° (3π/5) on an analog basis. The two phase-shifted digital baseband transmit signals are converted into analog signals by the digital-to-analog converters 9 and 10, whereby the analog baseband transmit signals I' and Q' having a phase difference of 108° (3π/5) can be produced.

<<Other Logic Divider>>

Figure 18:
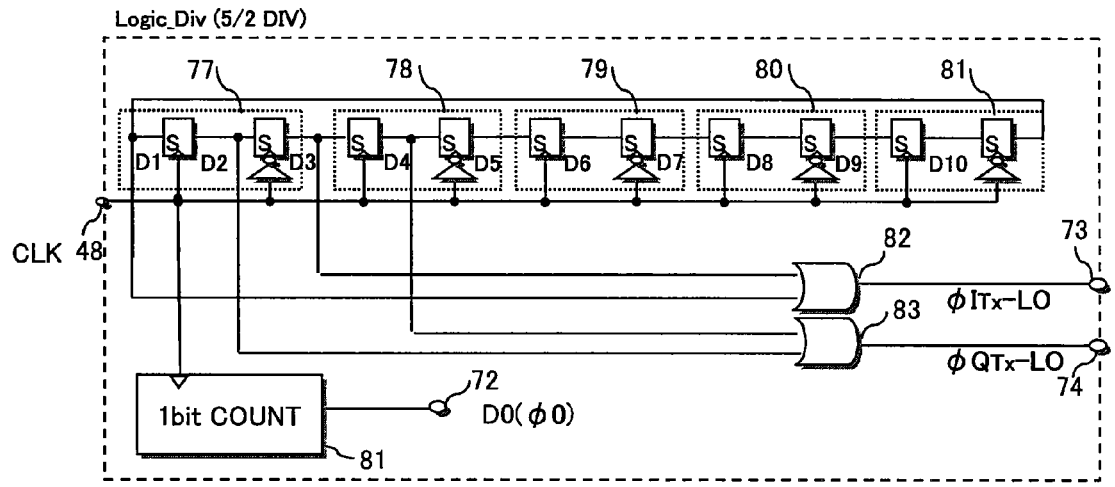
FIG. 18 is a diagram showing a configuration of a logic divider which is included in the transmitter as shown in FIG. 17 and has a dividing factor set to a non-integral number of 2.5.

FIG. 18 is a diagram showing a configuration of a logic divider 3 which is included in the transmitter according to the embodiment of the invention as shown in FIG. 17 and has a dividing factor set to a non-integral number of 2.5. To the input terminal 48, a clock signal CLK, which is an oscillating output signal φ0 from the transmitter-side voltage-controlled oscillator 4, is supplied. The logic divider 3 as shown in FIG. 18 is similar to the logic divider 3 as shown in FIG. 14.

The logic divider 3 as shown in FIG. 18 includes a counter formed by connecting five master and slave flip-flops 77 to 81, each including two delay-type flip-flops (FF) in a loop. Each delay-type FF latches therein an input signal supplied to a sampling input terminal S thereof in response to a negative edge supplied to the trigger input terminal. A negative edge of the clock signal CLK is supplied to a trigger input terminal of each of odd-numbered delay-type FFs, whereas to a trigger input terminal of each of the even-numbered delay-type FFs, a negative edge of an inverted clock signal CLKB resulting from inversion by the corresponding inverter is supplied.

The clock signal entered through the input terminal 48 is directly supplied to a trigger input terminal of a 2-divider 81 composed of a 1-bit counter. Then, an output signal D0 resulting from frequency-division of the clock signal CLK by 2 is produced in the 2-divider 81 and output through an output terminal 72 thereof. The output signal D0 resulting from frequency-division by 2 can be used as the oscillating output signal φ0 of the transmitter-side voltage-controlled oscillator 4 of the communication RF IC as shown in FIG. 17. To input terminals of an OR circuit 82, the first delay input signal D1 and the third delay FF input signal D3 are supplied respectively. To input terminals of an OR circuit 83, the second delay input signal D2 and the fourth delay FF input signal D4 are supplied respectively.

Figure 19:
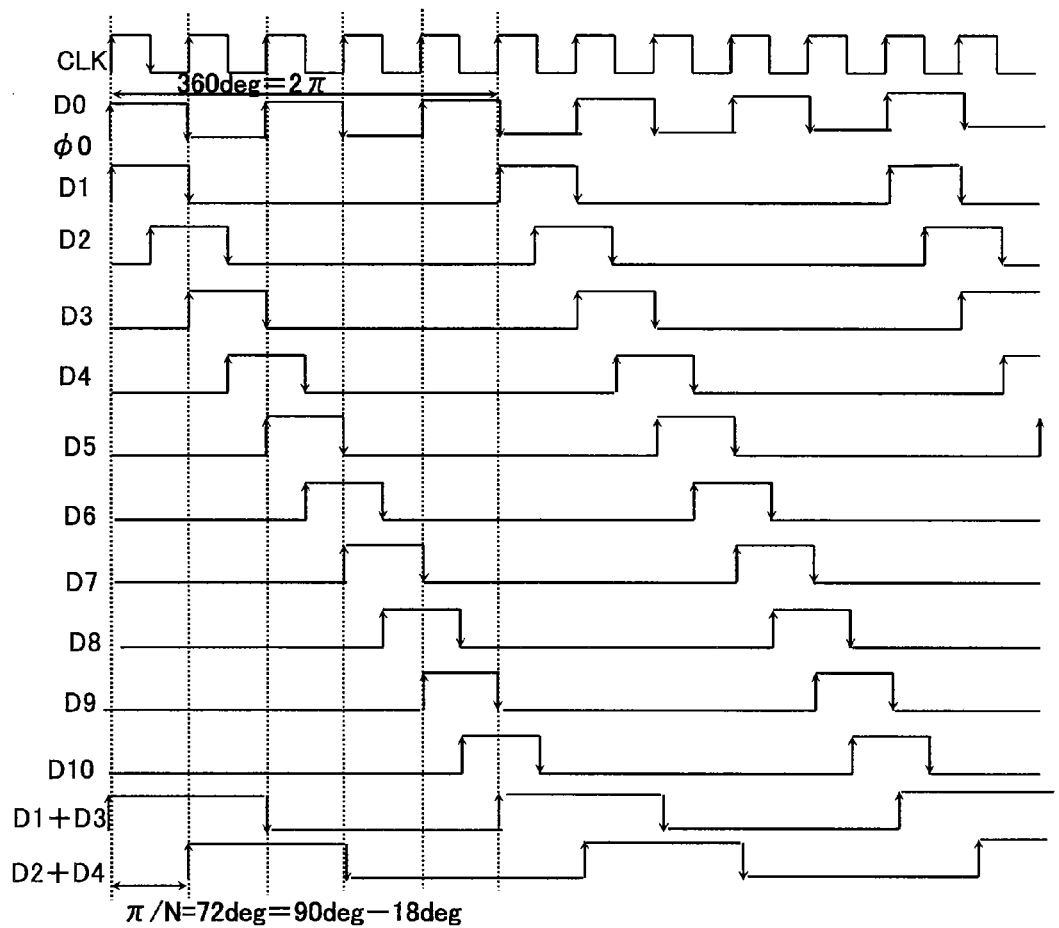
FIG. 19 is a time chart showing waveforms in the logic divider as shown in FIG. 18.

FIG. 19 is a time chart showing waveforms in the logic divider 3 as shown in FIG. 18. With the aid of the OR circuits 82 and 83, OR output signals D1+D3 and D2+D4 having a phase difference of 72° (2π/5) can be output as a pair of transmitter-side local signals φItx–LO(17) and φQTx–LO (18).

<<Change in Image Rejection Ratio Owing to Phase Error of Transmitter-Side I/Q Modulator>>

Figure 20:
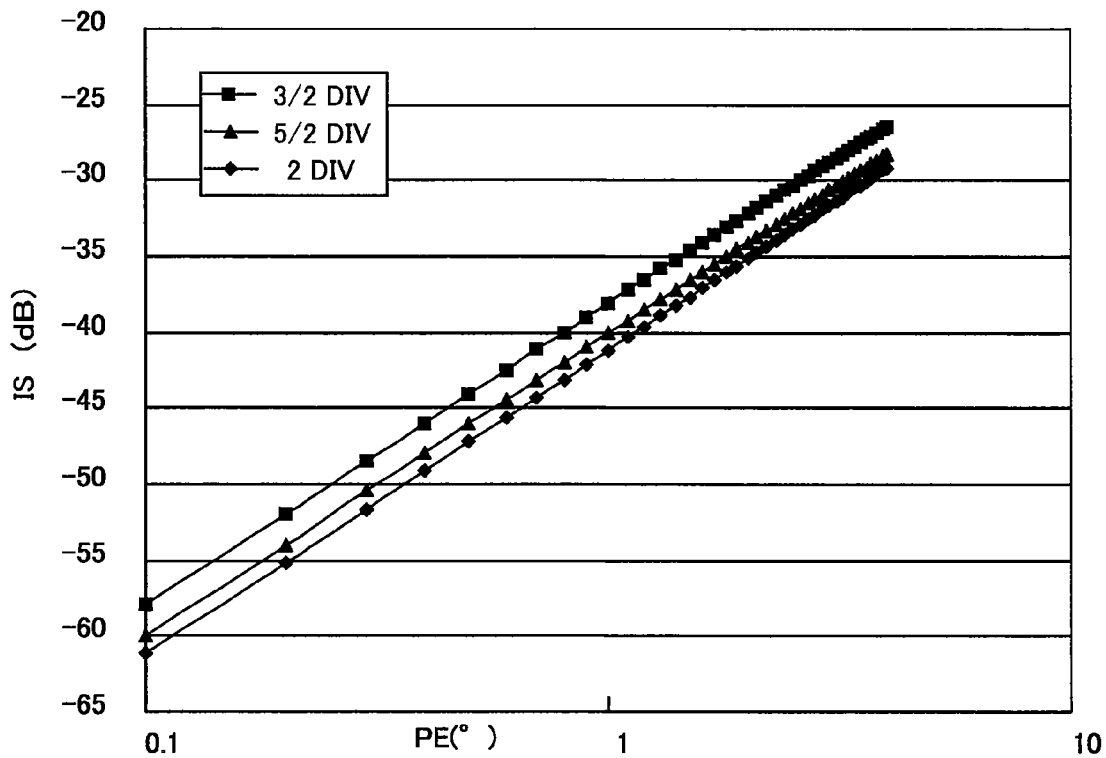
FIG. 20 is a graph showing change in image rejection ratio owing to a phase error of the transmitter-side I/Q modulator according to the dividing factor of the logic divider of the DUC architecture-based transmitter of the communication RF IC.

FIG. 20 is a graph showing change in image rejection ratio owing to a phase error of the transmitter-side I/Q modulator according to the dividing factor of the logic divider 3 of the DUC architecture-based transmitter of the communication RF IC. In the drawing, the horizontal axis PE shows a phase error of a pair of transmitter-side local signals supplied to the transmitter-side I/Q modulator, or a phase error of a pair of analog baseband transmit signals; the vertical axis IS shows an image rejection ratio.

When the dividing factor of the logic divider 3 of the transmitter is set to a typical value of 2 (2 DIV), the image rejection ratio with respect to the change in phase difference is large, and a good property is achieved. When the dividing factor of the logic divider 3 is set to a value of 3/2 (=1.5) as in the cases of the transmitters according to the embodiments of the invention as shown in FIGS. 10, 11 and 16 (3/2 DIV), the image rejection ratio with respect to the change in phase difference is smaller, and the property is not so good. When the dividing factor of the logic divider 3 is set to a value of 5/2 (=2.5) as in the case of the transmitter according to the embodiment of the invention as shown in FIG. 17 (5/2 DIV), the image rejection ratio with respect to the change in phase difference is between the curves of the dividing factors 2 and 3/2, and a relatively better property can be achieved.

<<Change in Image Rejection Ratio According to Duty Ratio of the Transmitter-Side Local Signal>>

Figure 22:
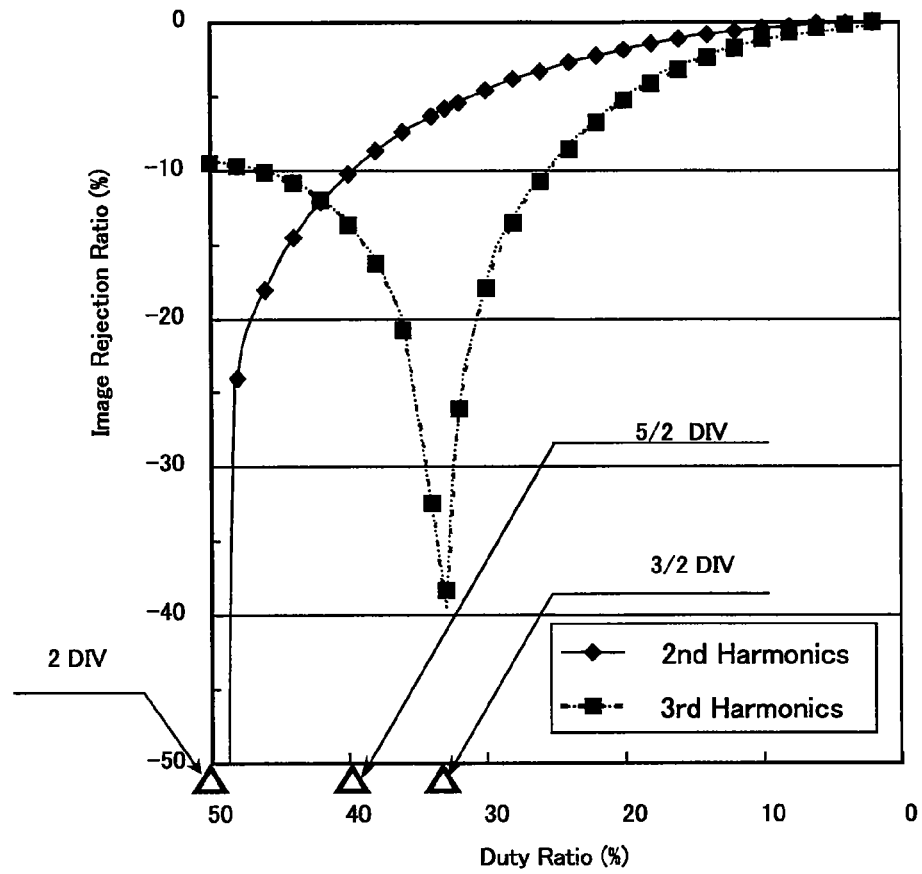
FIG. 22 is a graph showing change in image rejection ratio according to the duty ratio of the transmitter-side local signal of the DUC architecture-based transmitter of the communication RF IC.

FIG. 22 is a graph showing change in image rejection ratio according to the duty ratio of the transmitter-side local signal of the DUC architecture-based transmitter of the communication RF IC.

Figure 21:
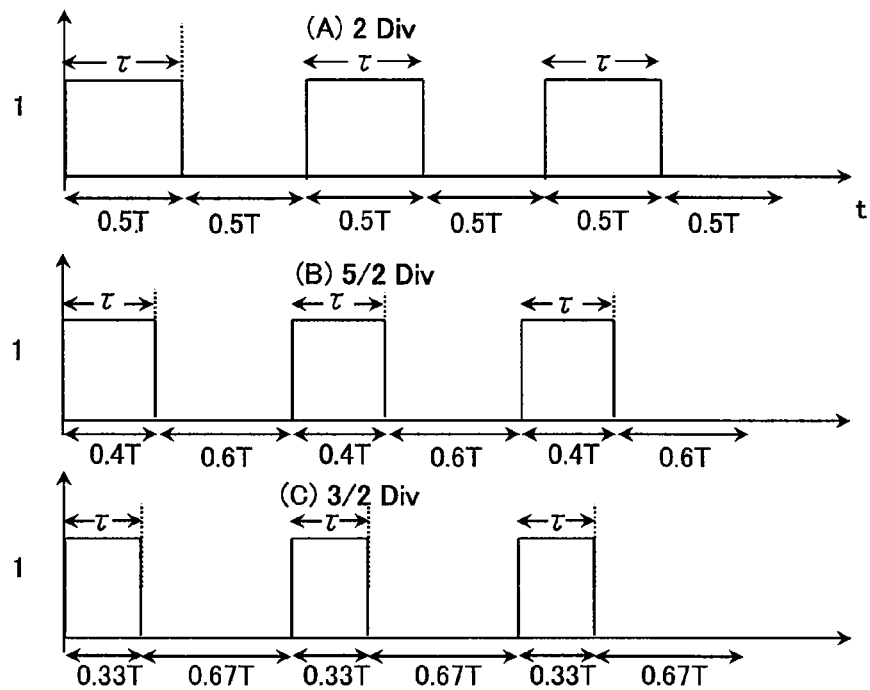
FIGS. 21A to 21C are a set of time charts for showing the difference in duty ratio of the transmitter-side local signal when the dividing factor of the logic divider of the DUC architecture-based transmitter of the communication RF IC is set to values of 2, 5/2 and 3/2.

FIGS. 21A to 21C are a set of time charts for showing the difference in duty ratio of the transmitter-side local signal when the dividing factor of the logic divider 3 of the DUC architecture-based transmitter of the communication RF IC is set to values of 2, 5/2 and 3/2. FIG. 21A shows the transmitter-side local signal when the dividing factor of the logic divider 3 is set to 2, and the duty ratio of the transmitter-side local signal is 50 percent. FIG. 21B shows the transmitter-side local signal when the dividing factor of the logic divider 3 is set to 5/2, and the duty ratio of the transmitter-side local signal is 40 percent. FIG. 21C shows the transmitter-side local signal when the dividing factor of the logic divider 3 is set to 3/2, and the duty ratio of the transmitter-side local signal is 33 percent.

The horizontal axis of FIG. 22 shows the duty ratio of the transmitter-side local signal of the transmitter, and the vertical axis IS shows the image rejection ratio. In comparison with the case of the dividing factor of 2, when the dividing factor is changed to 5/2 and 3/2, the image rejection ratio according to the second harmonic is made smaller. However, when the dividing factor is set to 3/2, the image rejection ratio according to the third harmonic is remarkably large, and a good property is achieved.

<<Other Transmitter>>

Figure 23:
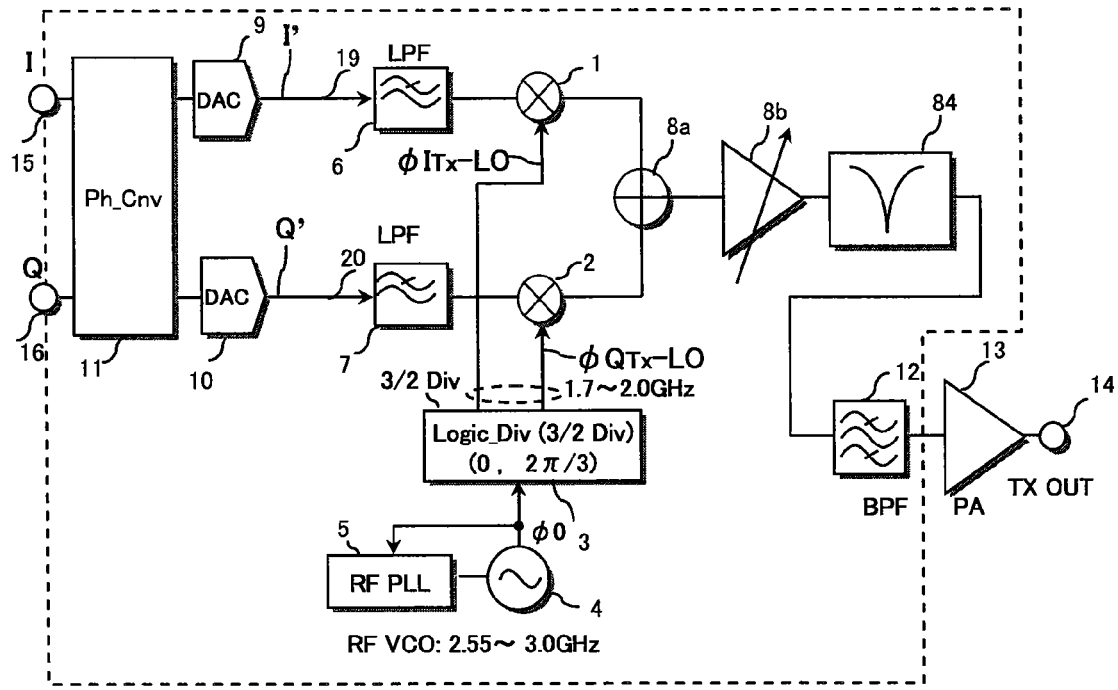
FIG. 23 is a diagram showing a primary portion of a DUC architecture-based transmitter of a communication RF IC according to another embodiment of the invention.

For example, FIG. 23 is a diagram showing a primary portion of a DUC architecture-based transmitter of a communication RF IC according to another embodiment of the invention. The transmitter shown in FIG. 23 differs from the transmitter as shown in FIG. 10 in that a notch filter 84 is additionally provided between an output of the variable-gain amplifier 8b and the band-pass filter 12. The notch filter 84 reduces the second harmonic when the dividing factor of the logic divider 3 is 5/2 and 3/2.

It is noted that the dividing factor of the logic divider 3 may be set to non-integral numbers such as 4/3 (=1.333), 8/5 (=1.6), 5/3 (=1.666), 7/4 (=1.75), 7/3 (=2.333), 8/3 (=2.666) and 7/2 (=3.5) in addition to 5/2 (=2.5) and 3/2 (=1.5).

<<Direct Down-Conversion Architecture-Based Receiver of Communication RF IC>>

The invention is applicable to not only a transmitter having a modulator including a pair of transmitter-side mixers but also a receiver having a demodulator including a pair of receiver-side mixers. FIG. 24 is a diagram showing a primary portion of a DDC architecture-based receiver of a communication RF IC according to another embodiment of the invention. Incidentally, DDC is an abbreviation of direct down-conversion. The communication RF IC has a receiver which includes a receiver-side demodulator for converting a received RF receive signal into an analog receive signal, and a transmitter which includes a transmitter-side modulator for converting an analog transmit signal into an RF transmit signal. Also, the communication RF IC includes, in its semiconductor chip, a low-noise amplifier 85, mixers 86I and 86Q of the receiver-side demodulator, low-pass filters LPF, variable-gain amplifiers VGA, analog-to-digital converters 89I and 89Q, a digital phase-shift unit 90, a divider 3, a receiver-side voltage-controlled oscillator 4, and a receiver-side RF PLL circuit 5.

As shown in FIG. 24, an RF receive signal received through an antenna ANT of a mobile phone is applied to an input terminal 91 of the receiver, made to pass through a band-pass filter 92, and supplied to an input terminal of the low-noise amplifier 85. An RF amplification output signal output by the low-noise amplifier 85 is supplied to one input terminals of the first and second mixers 86I and 86Q of the receiver-side demodulator. To the other input terminals of the first and second mixers 86I and 86Q of the receiver-side demodulator, a first receiver-side local signal φIRx_LO and a second receiver-side local signal φQRx_LO are supplied from the logic divider 3. A receiver-side oscillating output signal φ0 produced by the receiver-side voltage-controlled oscillator 4 under the control of the receiver-side RF PLL circuit 5 is supplied to an input terminal of the logic divider 3, whereby the first and second receiver-side local signals φIRx_LO and φQRx_LO are produced by the logic divider 3. In addition, the receiver-side RF PLL circuit 5 can be arranged substantially in the same way as the PLL circuit as shown in FIG. 7 is.

The dividing factor of the receiver-side logic divider 3 is set to not an integral number (e.g. 2) as in the prior art, but a non-integral number (i.e. a fractional number including a decimal), e.g. 3/2=1.5.

Therefore, the oscillating frequency of an oscillating output signal produced by the receiver-side voltage-controlled oscillator 4, which ranges 2.7 to 3.255 GHz, is shifted to the receiver-side local signal frequency of a pair of receiver-side local signals φIRx_LO and φQRx_LO, which ranges 1.8 to 2.17 GHz. The frequency of RF receive signals of Band3, Band1 and Band4 of WCDMA ranges 1.805 to 2.17 GHz approximately, and therefore the receiver as shown in FIG. 24 can receive the WCDMA RF receive signals. Further, as the dividing factor of the receiver-side logic divider 3 is set to a non-integral number such as 1.5, the receiver-side local signal frequency of the pair of receiver-side local signals φIRx_LO and φQRs_LO can be prevented from being subject to interference under the influence of harmonics affected by strong intensities of the receive fields of the WCDMA RF receive signals.

Figure 25:
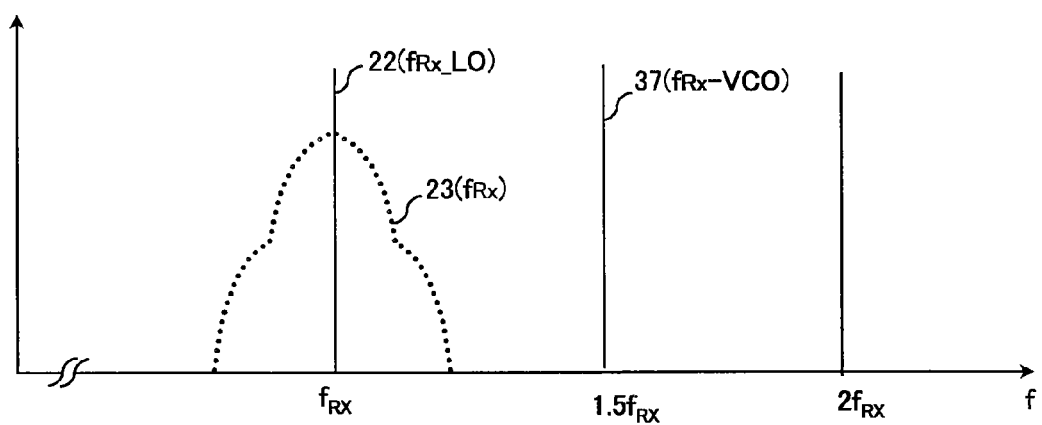
FIG. 25 is an illustration showing the relation of signal frequencies at the certain parts of the DDC architecture-based receiver of the communication RF IC as shown in FIG. 24.

FIG. 25 is an illustration showing the relation of signal frequencies at the certain parts of the DDC architecture-based receiver of the communication RF IC as shown in FIG. 24. As shown in a left portion of FIG. 25, frequency signal components of the WCDMA RF receive signal 23 are distributed near the receiver-side local signal 22 having a receiver-side local signal frequency fRx_LO (=$f_{Rx}$). Also, as in FIG. 25, at a nearly central portion, there is an oscillating output signal 37 from the receiver-side voltage-controlled oscillator 4, which has an oscillating frequency fRx_VCO (=1.5$f_{Rx}$). Further, as in FIG. 25, at a right portion, harmonic signals (of a frequency 2$f_{Rx}$) affected by the strong intensity of the receive field of a WCDMA RF receive signal are distributed.

The receiver-side logic divider 3 of the receiver as shown in FIG. 24 may be composed of the circuit as shown in FIG. 12 or FIG. 14. Therefore, the phase difference between paired receiver-side local signals φIRx_LO and φQRx_LO produced by the receiver-side logic divider 3 is made not 90° (π/2) but 120° (2π/3). As a result, the phase difference between paired receive analog baseband signals offered from outputs of the first and second mixers 86I and 86Q of the receiver-side demodulator is made not 90° (π/2) but 120° (2π/3). The pair of receive analog baseband signals having the phase difference of 120° (2π/3) is supplied to input terminals of the pair of analog-to-digital converters 89I and 89Q through the low-pass filters 87Ia, 87Qa, 87Ib, 87Qb, 87Ic and 87Qc, and variable-gain amplifiers 88Ia, 88Qa, 88Ib and 88Qb. Therefore, the digital receive baseband signals I' (t) and Q' (t) launched from the output terminals of the pair of analog-to-digital converters also have the phase difference of about 120° (2π/3) on an analog basis. The data translation unit 90 having a pair of input terminals connected with the output terminals of the pair of analog-to-digital converters 89I and 89Q converts the digital receive baseband signals I' (t) and Q'(t) into phase-shifted digital baseband signals I and Q and outputs the resultant signals through the pair of output terminals 91 and 92. With the aid of the phase-shift function of the data translation unit 90, the phase-shifted digital baseband signals I and Q offered through the pair of output terminals 91 and 92 have a phase difference of about 90° (π/2) on an analog basis. Hence, accurate quadrature demodulated digital baseband signals can be obtained through the pair of output terminals 91 and 92, which can be processed in the baseband signal-processing unit.

FIG. 26 is a diagram showing a primary portion of a DDC architecture-based receiver of a communication RF IC according to another embodiment of the invention. In comparison to the receiver as shown in FIG. 24, the receiver as shown in FIG. 26 is different in the place where the data translation unit 90 is connected and its phase-shift function. Specifically, in the receiver as shown in FIG. 26, the data translation unit 90 is connected between output terminals of low-pass filters 87Ic and 87Qc and input terminals of analog-to-digital converters 89I and 89Q. Therefore, the data translation unit 90 as shown in FIG. 26 directly converts, in analog, a pair of analog baseband receive signals I'(t) and Q' (t) having a phase difference of 120° (2π/3), which arise at output terminals of the low-pass filters 87Ic and 87Qc, into a pair of phase-shifted analog baseband signals I and Q having a phase difference of about 90° (π/2), and supplies the resultant signals to the input terminals of the analog-to-digital converters 89I and 89Q. Hence, also with the receiver as shown in FIG. 26, accurate quadrature demodulated digital baseband signals can be obtained through the pair of output terminals 91 and 92, which can be processed in the baseband signal-processing unit.

Now, the invention is not limited to the DUC architecture and DDC architecture, where DUC stands for direct up-conversion, and DDC stands for direct down-conversion. For instance, the invention is applicable to a low-IF down-conversion receiver architecture that an RF receive signal is converted into a receive signal of a relatively low intermediate frequency. Also, it is applicable to a low-IF up-conversion transmitter architecture that a transmit signal of a relatively low intermediate frequency is converted into an RF transmit signal.

Also, a digital IF down-conversion receiver architecture can be adopted for the receiver as shown in FIG. 24. According to the architecture, the receiver-side mixers 86I and 86Q perform first down-conversion to convert an RF receive signal into a first intermediate frequency signal, and the analog-to-digital converters 89I and 89Q are composed of band-pass ΔΣ modulators. The analog-to-digital converters 89I and 89Q composed of band-pass ΔΣ modulators can implement the analog-to-digital conversion involving second down-conversion from analog signals consisting of the first intermediate frequency signals into digital baseband receive signals.

In addition, the invention is not limited, in its application, to transceivers according to WCDMA system. The invention is also applicable to transceivers according to DCS1800 and PCS1900 of GSM, which send and receive RF signals of about 2 GHz, and transceivers by means of 2-GHz-wireless LANs.

<<Multiband-Ready Communication RF IC>>

Figure 27:
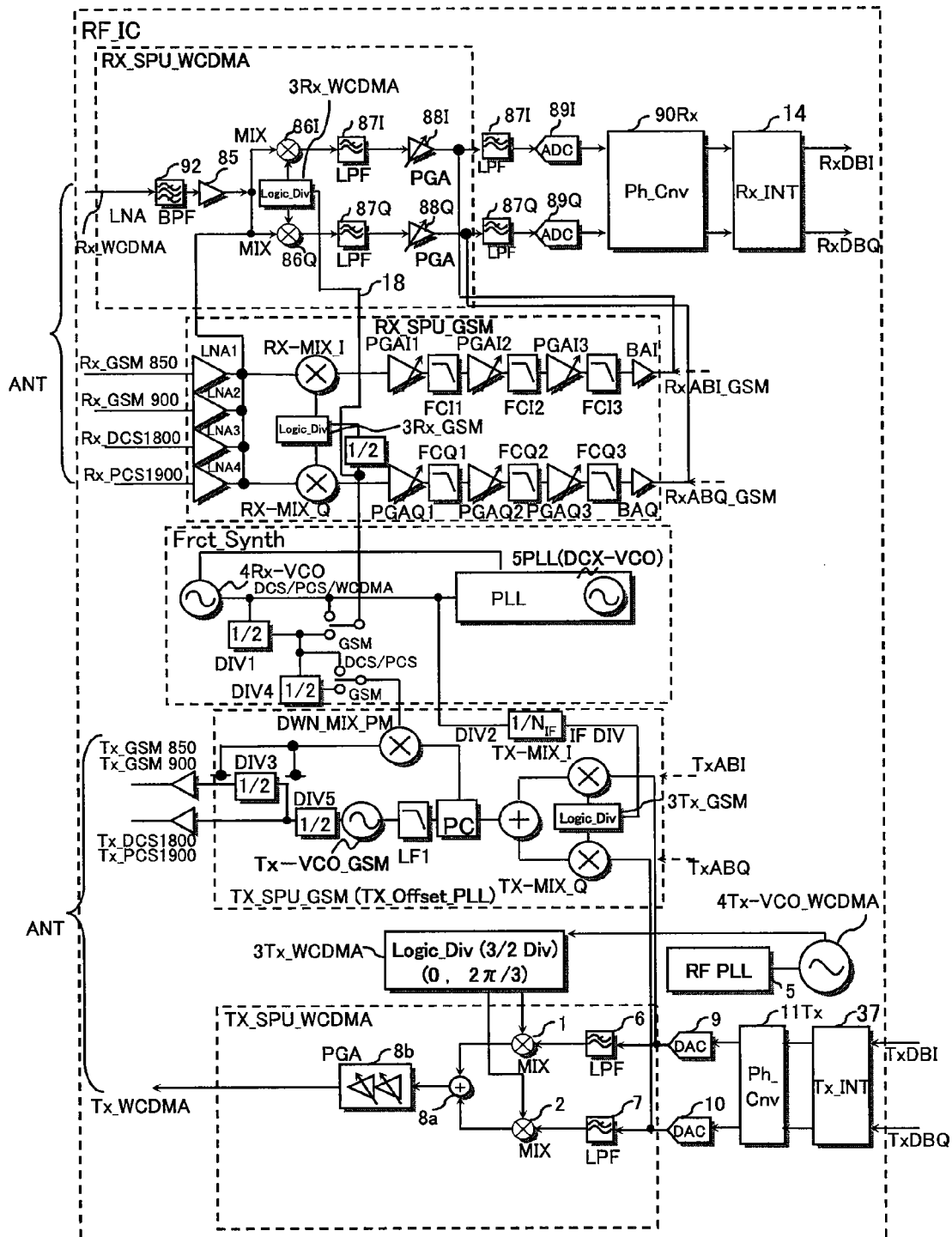
FIG. 27 is a block diagram showing a multiband-ready communication RF IC according to another embodiment of the invention.

FIG. 27 is a block diagram showing a multiband-ready communication RF IC according to another embodiment of the invention. The communication RF IC can receive and transmit signals of Band1, Band2 and Band 5 of WCDMA system, and signals according to GSM850, GSM900, DCS1800 and PCS1900 systems.

Figure 29:
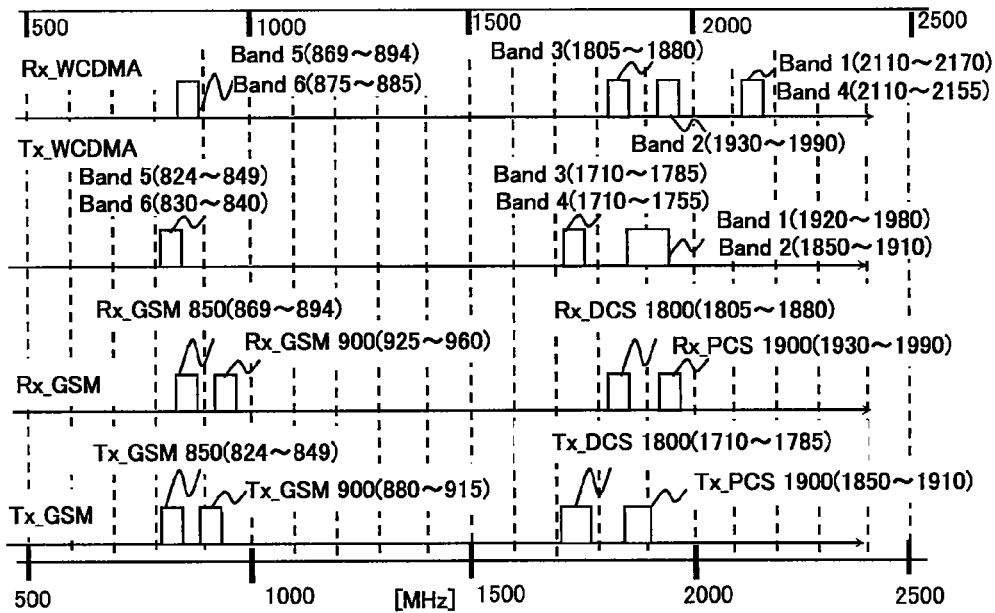
FIG. 29 is an illustration showing transmit and receive bands of various communication systems for mobile phones.

FIG. 29 is an illustration showing transmit and receive bands of various communication systems for mobile phones. In an upper portion of FIG. 29, transmit and receive bands of WCDMA system are shown. In the case of Band5 (the area of which is the U.S.A.), which is the lowest WCDMA-system frequency band, the frequency band of RF transmit signals TX of wireless communication terminals ranges 824 to 849 MHz, whereas the frequency band of RF receive signals RX of wireless communication terminals ranges 869 to 894 MHz. Likewise, in the case of Band2 of WCDMA system (the area of which is Europe), the frequency band of RF transmit signals TX of wireless communication terminals ranges 1850 to 1910 MHz, whereas the frequency band of RF receive signals RX of wireless communication terminals ranges 1930 to 1990 MHz. Further, in the case of Band1 (the area of which is the U.S.A.), which is the highest WCDMA-system frequency band in UMTS standards, the frequency band of RF transmit signals TX of wireless communication terminals ranges 1920 to 1980 MHz, whereas the frequency band of RF receive signals RX of wireless communication terminals ranges 2110 to 2170 MHz.

Also, there are other WCDMA system communications except these. In the case of Band6 (the area of which is Japan), a lower WCDMA-system frequency band, the frequency band of RF transmit signals TX of wireless communication terminals ranges 830 to 840 MHz, whereas the frequency band of RF receive signals RX of wireless communication terminals ranges 875 to 885 MHz. In the case of Band4 (the area of which is U.S.A.), which is a WCDMA-system frequency band, the frequency band of RF transmit signals TX of wireless communication terminals ranges 1710 to 1775 MHz, whereas the frequency band of RF receive signals RX of wireless communication terminals ranges 2110 to 2155 MHz. In the case of Band3 (the area of which is Europe), which is a WCDMA-system frequency band, the frequency band of RF transmit signals TX of wireless communication terminals ranges 1710 to 1785 MHz, whereas the frequency band of RF receive signals RX of wireless communication terminals ranges 1805 to 1880 MHz.

In a lower portion of FIG. 29 are shown transmit and receive bands of communication systems other than WCDMA system. In the case of GSM850, the frequency band of RF transmit signals TX of wireless communication terminals ranges 824 to 849 MHz, whereas the frequency band of RF receive signals RX of wireless communication terminals ranges 869 to 894 MHz. In the case of GSM900, the frequency band of RF transmit signals TX of wireless communication terminals ranges 880 to 915 MHz, whereas the frequency band of RF receive signals RX of wireless communication terminals ranges 925 to 960 MHz. In the case of DCS1800, the frequency band of RF transmit signals TX of wireless communication terminals ranges 1710 to 1785 MHz, whereas the frequency band of RF receive signals RX of wireless communication terminals ranges 1805 to 1880 MHz. In the case of PCS1900, the frequency band of RF transmit signals TX of wireless communication terminals ranges 1850 to 1910 MHz, whereas the frequency band of RF receive signals RX of wireless communication terminals ranges 1930 to 1990 MHz. As stated above, for any frequency bands, FDD system that the receive band frequency RX is higher than the transmit band frequency TX is adopted. Incidentally, FDD is an abbreviation of Frequency Division Duplex.

The circuit RX_SPU_WCDMA in an upper portion of the RF IC as shown in FIG. 27 is a circuit for receive in Band1, Band2 and Band5 of WCDMA system. The circuit TX_SPU_WCDMA in a lower portion of the RF IC as shown in FIG. 27 is a circuit for transmission in Band1, Band2 and Band5 of WCDMA system. The circuit RX_SPU_GSM above a central portion of the RF IC as shown in FIG. 27 is a circuit for receive in frequency bands of GSM850, GSM900, DCS1800 and PCS1900. The circuit TX_SPU_GSM below the central portion of the RF IC as shown in FIG. 27 is a circuit for transmission in frequency bands of GSM850, GSM900, DCS1800 and PCS1900.

The circuit Frct_Synth in the central portion of the RF IC as shown in FIG. 27 is a fractional synthesizer for forming receive and transmit local signals of the RF IC. The fractional synthesizer Frct_Synth includes a receiver-side voltage-controlled oscillator 4Rx-VCO, a phase lock loop (PLL) 5 incorporating a system reference voltage-controlled oscillator (DCX-VCO), dividers and switches.

As for any communication systems, in "Receive mode" outputs of the WCDMA receive circuit RX_SPU_WCDMA or outputs of other systems' receive circuit RX_SPU_GSM form I and Q analog baseband receive signals. The resultant signals are made to pass through low-pass filters 87I and 87Q, and supplied to analog-to-digital converters 89I and 89Q thereby to be converted into I and Q digital baseband receive signals. The resultant digital signals are made to pass through a digital phase-shift unit 90Rx and a receiver-system digital interface 14, and then supplied to a baseband signal-processing LSI. As to a logic divider 3Rx_WCDMA of the WCDMA receive circuit RX_SPU_WCDMA as shown in FIG. 27, the phase difference of a pair of receiver-side local signals supplied to a pair of receiver-side mixers 86I and 86Q in response to an oscillating output from the receiver-side voltage-controlled oscillator 4Rx-VCO is set to 120° ($2\pi/3$) as in the cases of the logic dividers 3 as shown in FIGS. 24 and 26. Also, with a logic divider 3Rx_GSM of the other systems' receive circuit RX_SPU_GSM as shown in FIG. 27, the phase difference of a pair of receiver-side local signals supplied to a pair of receiver-side mixers RX_MIX_I and RX_MIX_Q in response to an oscillating output from the receiver-side voltage-controlled oscillator 4Rx-VCO is set to 120° ($2\pi/3$) as in the cases of the logic dividers 3 as shown in FIGS. 24 and 26. The digital phase-shift unit 90Rx connected with the analog-to-digital converters 89I and 89Q performs data translation so that two digital receive signals obtained from two output terminals have a phase difference of 90° on an analog basis as in the case of the digital phase-shift unit 90 as shown in FIG. 24, which is common to receives in WCDMA system and receives in GSM system.

In reverse, digital baseband transmit signals TxDBI and TxDBQ from the baseband signal-processing LSI are received through a transmitter-system digital interface 37 of the RF IC, and then subjected to data translation by a digital phase-shift unit 11Tx. Digital baseband transmit input signals at two input terminals of the digital phase-shift unit 11Tx have a phase difference of 90 on an analog basis. However, digital shifted signals at two output terminals of the digital phase-shift unit 11Tx have an analog signal phase difference of 90° plus a predetermined analog offset angle on an analog basis. The digital shifted signals arising at the two output terminals of the digital phase-shift unit 11Tx are converted into analog baseband signals by digital-to-analog converters 9 and 10. The analog signal phase difference between the analog baseband signals arising at outputs of the digital-to-analog converters 9 and 10 is 90° plus a predetermined analog offset angle.

In transmission according to WCDMA system, analog baseband signals arising at the outputs of the digital-to-analog converters 9 and 10 are supplied to one input terminals of a pair of transmitter-side mixers 1 and 2 through low-pass filters 6 and 7 of the WCDMA transmit circuit TX_SPU_WCDMA. An oscillating output of a transmitter-side voltage-controlled oscillator 4Tx-VCO_WCDMA controlled by a transmitter-side RF PLL circuit 5 is supplied to a logic divider 3Tx_WCDMA. Also, as to the logic divider 3Tx_WCDMA of the WCDMA transmit circuit TX_SPU_WCDMA as shown in FIG. 27, the local signal phase difference of the pair of transmitter-side local signals supplied to the paired transmitter-side mixers 1 and 2 in response to an oscillating output from the transmitter-side voltage-controlled oscillator 4Tx-VCO_WCDMA is 90° plus a predetermined local offset angle as in the case of the logic divider 3 as shown in FIG. 10. The sum of the predetermined local offset angle and the predetermined analog offset angle is substantially zero, which enables an accurate quadrature modulation by a transmitter-side modulator including one pair of transmitter-side mixers 1 and 2 and an adder 8a.

In transmission according to GSM system, analog baseband signals arising at the outputs of the digital-to-analog converters 9 and 10 are supplied to one input terminals of a pair of transmitter-side mixers TX-MIX_I and TX-MIX_Q of other systems' transmit circuit TX_SPU_GSM. An oscillation signal of the voltage-controlled oscillator 4Rx-VCO controlled by the PLL circuit 5 of the fractional synthesizer Frct_Synth is supplied to a logic divider 3Tx_GSM through an intermediate frequency divider DIV2($1/N_{IF}$). Also, for the logic divider 3Tx_GSM of the other systems' transmit circuit TX_SPU_GSM as shown in FIG. 27, the local signal phase difference of a pair of transmitter-side intermediate-frequency local signals supplied to the pair of transmitter-side mixers TX-MIX_I and TX-MIX_Q in response to an intermediate frequency signal from an output of the divider DIV2 ($1/N_{IF}$) is 90° plus a predetermined local offset angle. The sum of the predetermined local offset angle and the predetermined analog offset angle is substantially zero, which enables an accurate quadrature modulation by a transmitter-side modulator including one pair of transmitter-side mixers TX-MIX_I and TX-MIX_Q and an adder.

The transmitter-system offset PLL circuit TX_Offset_PLL is required to cope with transmit operations in connection with an RF transmit signal Tx_GSM850 of GSM850 and an RF transmit signal Tx_GSM900 of GSM900. On this account, the oscillating frequency of the receiver-side voltage-controlled oscillator 4Rx-VCO is supplied to one input terminal of a phase control feedback-use frequency down mixer DWN_MIX_PM through two dividers DIV1(1/2) and DIV4(1/2) with their dividing factors set to 2. The dividing factor $N_{IF}$ of the intermediate frequency divider DIV2 ($1/N_{IF}$)

connected to the logic divider 3Tx_GSM for the transmitter-side mixers TX-MIX_I and TX-MIX_Q is set to 35. On the other hand, an oscillating output signal of a GSM transmitter-side voltage-controlled oscillator Tx-VCO_GSM is supplied to the other input terminal of the phase control feedback-use frequency down mixer DWN_MIX_PM through two dividers DIV5 and DIV3 which are both set to have a dividing number of 2. As a result, in the down mixer DWN_MIX_PM, mixing of one input signal and the other input signal is performed. Therefore, an output of the down mixer DWN_MIX_PM forms a feedback signal having a frequency of the difference between the two input signals, which is supplied to a second input terminal of a phase comparator PC of the transmitter-system offset PLL circuit TX_Offset_PLL. Further, to a first input terminal of the phase comparator PC, an intermediate-frequency transmit signal $f_{IF}$ subjected to vector synthesis, which is an output of an adder connected with outputs of the transmitter-side mixers TX-MIX_I and TX-MIX_Q, is supplied as a reference signal. In this case, the total dividing number is 52.5 because the dividing number $N_{IF}$ of the intermediate frequency divider DIV2 ($1/N_{IF}$) is 35 and the dividing number of the logic divider 3Tx_GSM is 1.5. Hence, the frequency of the intermediate-frequency transmit signal $f_{IF}$ is 1/52.5 times the frequency of the receiver-side voltage-controlled oscillator 4Rx-VCO. In addition, the reference signal supplied to the first input terminal of the phase comparator PC coincides with a feedback signal supplied to the second input terminal from the down mixer DWN_MIX_PM because of negative feedback control by the transmitter-system offset PLL circuit TX_Offset_PLL. Thus, for transmit operations in GSM850 using an RF transmit signal of 0.8 GHz and GSM900 using an RF transmit signal of 0.9 GHz, it is sufficient that the receiver-side voltage-controlled oscillator 4Rx-VCO and the GSM transmitter-side voltage-controlled oscillator Tx-VCO_GSM oscillate at substantially quadruple the transmitter frequency, i.e. between 3.6 and 3.9 GHz approximately.

Also, the transmitter-system offset PLL circuit TX_Offset_ PLL is required to cope with transmit operations in connection with an RF transmit signal Tx_DCS1800 of DCS1800 and an RF transmit signal Tx_PSC1900 of PSC1900. On This account, the oscillating frequency of the receiver-side voltage-controlled oscillator 4Rx-VCO is supplied to the one input terminal of the phase control feedback-use frequency down mixer DWN_MIX_PM through the divider DIV1(1/2) with its dividing factor set to 2. The dividing factor $N_{IF}$ of the intermediate frequency divider DIV2 ($1/N_{IF}$) connected to the logic divider 3Tx_GSM for the transmitter-side mixers TX–MIX_I and TX-MIX_Q is set to 35. On the other hand, the oscillating output signal of the GSM transmitter-side voltage-controlled oscillator Tx–VCO_GSM is supplied to the other input terminal of the phase control feedback-use frequency down mixer DWN_MIX_PM through one divider DIV5 set to have a dividing number of 2. As a result, in the down mixer DWN_MIX_PM, mixing of one input signal and the other input signal is performed. Therefore, an output of the down mixer DWN_MIX_PM forms a feedback signal having a frequency of the difference between the two input signals, which is supplied to the second input terminal of the phase comparator PC of the transmitter-system offset PLL circuit TX_Offset_PLL. Further, to the first input terminal of the phase comparator PC, an intermediate-frequency transmit signal $f_{IF}$ subjected to vector synthesis, which is an output of the adder connected with the outputs of the transmitter-side mixers TX–MIX_I and TX–MIX_Q, is supplied as a reference signal. In this case, the total dividing number is 52.5 because the dividing number $N_{IF}$ of the intermediate frequency divider DIV2 ($1/N_{IF}$) is 35 and the dividing number of the logic divider 3Tx_GSM is 1.5. Hence, the frequency of the intermediate-frequency transmit signal $f_{IF}$ is 1/52.5 times the frequency of the receiver-side voltage-controlled oscillator 4Rx-VCO. In addition, the reference signal supplied to the first input terminal of the phase comparator PC coincides with the feedback signal supplied to the second input terminal from the down mixer DWN_MIX_PM because of negative feedback control by the transmitter-system offset PLL circuit TX_Offset_PLL. Thus, for transmit operations in DCS1800 using an RF transmit signal of 1.7 GHz and PCS1900 using an RF transmit signal of 1.9 GHz, it is sufficient that the receiver-side voltage-controlled oscillator 4Rx–VCO and the GSM transmitter-side voltage-controlled oscillator Tx–VCO_GSM oscillate at substantially double the transmitter frequency, i.e. between 3.6 and 3.9 GHz approximately. <<Mobile Phone Structure>>

Figure 28:
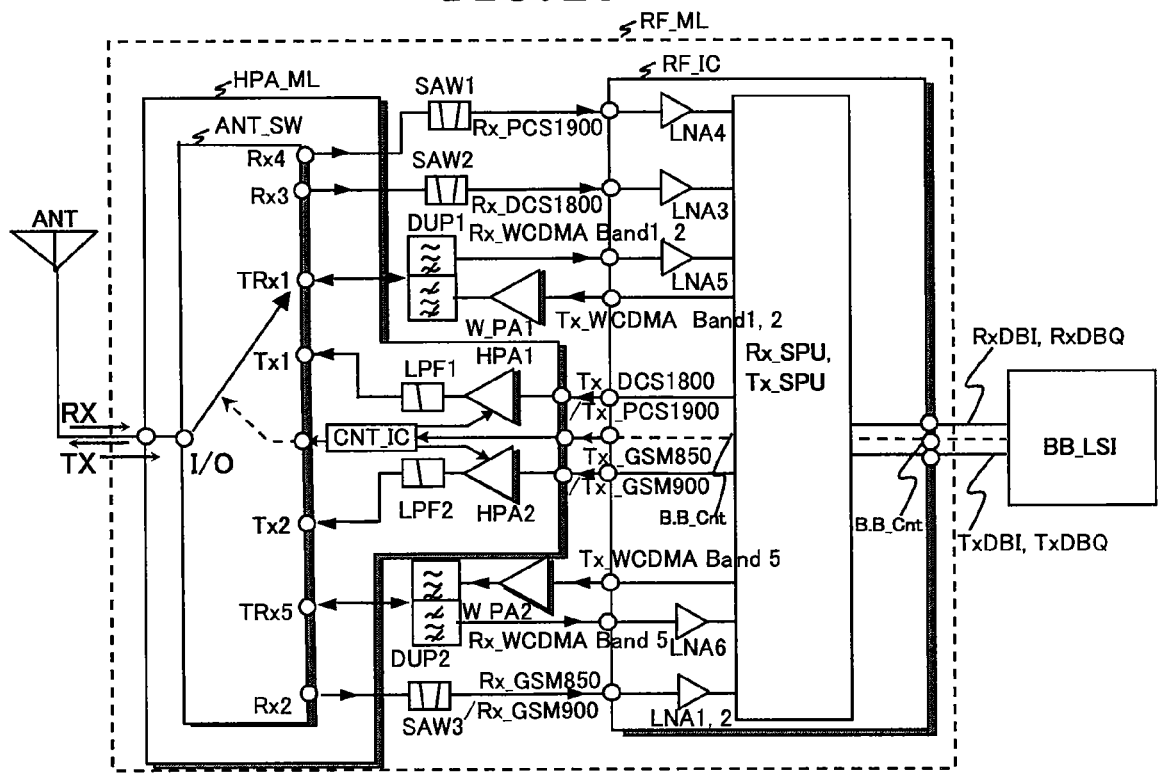
FIG. 28 is a block diagram showing a configuration of a mobile phone equipped with an RF IC according to one embodiment of the invention as described above, an RF module incorporating an antenna switch MMIC and an RF power amplifier, and a baseband signal-processing LSI.

FIG. 28 is a block diagram showing a configuration of a mobile phone equipped with an RF IC according to one embodiment of the invention as described above, an RF module incorporating an antenna switch MMIC and an RF power amplifier, and a baseband signal-processing LSI. Incidentally, MMIC is an abbreviation of Microwave Monolithic IC.

As in the drawing, a transmitting and receiving antenna ANT of the mobile phone is connected with, a common input-output terminal I/O of the antenna switch MMIC (ANT_SW) of the RF module RF_ML. A Control signal B.B_Cnt from the baseband signal-processing LSI (BB_LSI) is supplied to a controller integrated circuit (CNT_IC) of the high-output-power amplification module (HPA_ML) through the RF analog signal-processing semiconductor integrated circuit (RF_IC). The flow of an RF signal from the transmitting and receiving antenna ANT to the common input-output terminal I/O is handled in a receive operation RX of the mobile phone, and the flow of an RF signal from the common input-output terminal I/O to the transmitting and receiving antenna ANT is treated in a transmit operation TX of the mobile phone.

The RF IC (RF_IC) performs frequency up-conversion of a pair of digital baseband transmit signals TxDBI and TxDBQ supplied from the baseband signal-processing LSI (BB_LSI) into RF transmit signals. In reverse, the RF IC (RF_IC) also performs frequency down-conversion of an RF receive signal received through the transmitting and receiving antenna ANT into a pair of digital baseband receive signals RXDBI and RXDBQ, and supplies the resultant paired signals to the baseband signal-processing LSI (BB_LSI).

The antenna switch MMIC (ANT_SW) of the RF module RF_ML establishes a signal path between the common input-output terminal I/O and one of transmitting terminals Tx1 and Tx2, receiving terminals Rx2, Rx3 and Rx4, and transmitting and receiving terminals TRx1 and TRx5, and then performs a receive operation RX or a transmit operation TX. The switch used for transmit and receive operations of an RF signal is composed of a HEMT (High Electron Mobility Transistor), and the antenna switch MMIC consists of a microwave monolithic integrated circuit (MIC) using a compound semiconductor such as GaAs. As for the antenna switch MMIC (ANT_SW), required isolation can be achieved by setting the impedance of a signal path to an extremely high value, provided that the signal path is not the one which has been established for the receive operation RX or the transmit operation TX. In the field of antenna switches, the common input-output terminal I/O is termed "Single Pole", and a total of seven terminals consisting of the transmitting terminals Tx1 and Tx2, receiving terminals Rx2, Rx3 and Rx4, and transmitting and receiving terminals TRx1 and TRx5 is termed "7 throw". Therefore, the antenna switch MMIC (ANT_SW) as shown in FIG. 28 is a SP7T type switch, provided that SP7T is an abbreviation of Single Pole 7 throw.

Now, the baseband signal-processing LSI (BB_LSI) is connected to an external nonvolatile memory and an application processor, and both are not shown in the drawing. As the application processor is connected to a liquid crystal display device and a key input device (both are not shown), various kinds of application programs including a general-purpose program and an electronic game can be executed. A boot program (or starting initialization program), an operating system program (OS), programs for phase demodulation in association with receive baseband signals of GSM system or the like by a digital signal processor (DSP) inside the baseband signal-processing LSI, and programs for phase modulation concerning transmit baseband signals by the digital signal processor, and various application programs for mobile devices including mobile phones can be stored in an external nonvolatile memory.

<<Transmit and Receive Operations According to GSM850 and GSM900>>

Assumed is the case where a pair of transmit baseband signals TXDBI and TxDBQ from the baseband signal-processing LSI (BB_LSI) is to be converted up to a GSM850 band in frequency. In this case, the transmit signal-processing unit Tx_SPU of the RF IC performs up-conversion of the pair of transmit baseband signals to the GSM850 band in frequency, whereby a GSM850 RF transmit signal Tx_GSM 850 is produced. Further, assumed is the case where a transmit baseband signal from the baseband signal-processing LSI (BB_LSI) is to be converted up to a GSM900 band in frequency. In this case, the transmit signal-processing unit Tx_SPU of the RF IC performs up-conversion of the pair of transmit baseband signals to the GSM900 band in frequency, whereby a GSM900 RF transmit signal Tx_GSM 900 is produced. The GSM850 RF transmit signal Tx_GSM 850 and GSM900 RF transmit signal Tx_GSM 900 are amplified by a high-output power amplifier HPA2 of the high-output-power amplification module (HPA_ML) in electric power. An RF output of the high-output power amplifier HPA2 is supplied to the transmitting terminal Tx2 of the antenna switch MMIC (ANT_SW) through a low-pass filter LPF2. The GSM850 RF transmit signal Tx_GSM 850 and GSM900 RF transmit signal Tx_GSM 900, both supplied to the transmitting terminal Tx2, can be sent out from the transmitting and receiving antenna ANT through the common input-output terminal I/O.

In reverse, a GSM850 RF receive signal Rx_GSM 850 and a GSM900 RF receive signal Rx_GSM 900 received through the transmitting and receiving antenna ANT are supplied to the common input-output terminal I/O of the antenna switch MMIC (ANT_SW). The GSM850 RF receive signal Rx_GSM 850 and GSM900 RF receive signal Rx_GSM 900, which have entered through the receiving terminal Rx2 of the antenna switch MMIC (ANT_SW), are made to pass through a surface-acoustic-wave filter SAW3, and then amplified by low-noise amplifiers LNA1 and LNA2 of the RF IC. The resultant RF receive signals are thereafter supplied to a receive signal-processing unit Rx_SPU. The receive signal-processing unit Rx_SPU performs down-conversion of the GSM850 RF receive signal Rx_GSM 850 or GSM900 RF receive signal Rx_GSM 900 into a pair of receive baseband signals RxDBI and RxDBQ in frequency.

In a transmit and receive mode of GSM850, the antenna switch MMIC responds to a control signal B.B_Cnt, and performs the following operations according to a time division technique: connecting between the input-output terminal I/O and transmitting terminal Tx2 thereby to transmit an RF transmit signal Tx_GSM850; and connecting between the input-output terminal I/O and receiving terminal Rx2 thereby to receive an RF receive signal Tx_GSM850. Likewise, in a transmit and receive mode of GSM900, the antenna switch MMIC responds to a control signal B.B_Cnt, and performs the following operations according to the time division technique: connecting between the input-output terminal I/O and transmitting terminal Tx2 thereby to transmit an RF transmit signal Tx_GSM 900; and connecting between the input-output terminal I/O and receiving terminal Rx2 thereby to receive an RF receive signal Rx_GSM 900.

<<Transmit and Receive Operations According to DCS1800 and PCS1900>>

Assumed is the case where a pair of transmit baseband signals TxDBI and TxDBQ from the baseband signal-processing LSI (BB_LSI) is to be converted up to a DCS1800 band in frequency. In this case, the transmit signal-processing unit Tx_SPU of the RF IC performs up-conversion of the pair of transmit baseband signals to the DCS1800 band in frequency, whereby a DCS1800 RF transmit signal Tx_CSC1800 is produced. Further, assumed is the case where a transmit baseband signal from the baseband signal-processing LSI (BB_LSI) is to be converted up to a PCS1900 band in frequency. In this case, the transmit signal-processing unit Tx_SPU of the RF IC performs up-conversion of the pair of transmit baseband signals to the PCS1900 band in frequency, whereby a PCS1900 RF transmit signal Tx_PCS1900 is produced. The DCS1800 RF transmit signal Tx_DCS1800 and PCS1900 RF transmit signal Tx_PCS1900 are amplified by a high-output power amplifier HPA1 of the high-output-power amplification module (HPA_mL) in electric power. An RF output of the high-output power amplifier HPA1 is supplied to the transmitting terminal Tx1 of the antenna switch MMIC (ANT_SW) through a low-pass filter LPF1. The DCS1800 RF transmit signal Tx_CSC1800 and PCS1900 RF transmit signal Tx_PCS1900, both supplied to the transmitting terminal Tx1, can be sent out from the transmitting and receiving antenna ANT through the common input-output terminal I/O.

In reverse, a DCS1800 RF receive signal Rx_DCS1800 and a CS1900 RF receive signal Rx_PCS1900 received through the transmitting and receiving antenna ANT are supplied to the common input-output terminal I/O of the antenna switch MMIC. The DCS1800 RF receive signal Rx_DCS1800, which has entered through the receiving terminal Rx3 of the antenna switch MMIC, is made to pass through a surface-acoustic-wave filter SAW2, and then amplified by a low-noise amplifier LNA3 of the RF IC (RF_IC). The PCS1900 RF receive signal Rx_PCS1900, which has entered through the receiving terminal Rx4 of the antenna switch MMIC (ANT_SW), is made to pass through a surface-acoustic-wave filter SAW1, and then amplified by a low-noise amplifier LNA4 of the RF IC. The resultant DCS1800 RF receive signal Rx_DCS1800 and CS1900 RF receive signal Rx_PCS1900 are thereafter supplied to the receive signal-processing unit Rx_SPU. The receive signal-processing unit Rx_SPU performs down-conversion of the DCS1800 RF receive signal Rx_DCS1800 or PCS1900 RF receive signal Rx_PCS1900 into a pair of receive baseband signals RxDBI and RxDBQ in frequency.

In a transmit and receive mode of DCS1800, the antenna switch MMIC responds to a control signal B.B_Cnt, and performs the following operations according to the time division technique: connecting between the input-output terminal I/O and transmitting terminal Tx1 thereby to transmit an RF transmit signal Tx_DCS1800; and connecting between the input-output terminal I/O and receiving terminal Rx3 thereby to receive an RF receive signal Rx_DCS1800. Likewise, in a transmit and receive mode of PCS1900, the antenna switch MMIC responds to a control signal B.B_Cnt, and performs the following operations according to the time division technique: connecting between the input-output terminal I/O and transmitting terminal Tx1 thereby to transmit an RF transmit signal Tx_PCS1900; and connecting between the input-output terminal I/O and receiving terminal Rx4 thereby to receive an RF receive signal Rx_PCS1900.

<<Transmit and Receive Operations According to WCDMA>>

Assumed is the case where a pair of digital baseband transmit signals TxDBI and TxDBQ from the baseband signal-processing LSI (BB_LSI) is to be converted up to WCDMA system Band1/Band2 in frequency. In this case, the transmit signal-processing unit Tx_SPU of the RF IC performs up-conversion of the pair of transmit baseband signals to the WCDMA system Band1/Band2 in frequency. The RF transmit signals Tx_WCDMA Band1/Tx_WCDMA Band2 of WCDMA system Band1/Band2 are amplified by the high-output power amplifier W-PA1 in electric power, made to pass through a duplexer DUP1, and then supplied to the transmitting and receiving terminal TRx1 of the antenna switch MMIC. The RF transmit signals Tx_WCDMA Band1/Tx_WCDMA Band2 of WCDMA system Band1/Band2 supplied to the transmitting and receiving terminal TRx1 can be sent out from the transmitting and receiving antenna ANT through the common input-output terminal I/O.

According to WCDMA system, transmit and receive operations can be processed in parallel by code division. Specifically, an RF receive signal Rx_WCDMA Band1/Rx_WCDMA Band2 of WCDMA system Band1/Band2 received through the transmitting and receiving antenna ANT is supplied to the common input-output terminal I/O of the antenna switch MMIC. The RF receive signal Rx_WCDMA Band1/Rx_WCDMA Band2 of WCDMA system Band1/Band2, which has entered through the transmitting and receiving terminal TRx1 of the antenna switch MMIC, is made to pass through the duplexer DUP1, amplified by a low-noise amplifier LNA5 of the RF IC, and then supplied to the receive signal-processing unit Rx_SPU. In the receive signal-processing unit Rx_SPU, down-conversion of the RF receive signal Rx_WCDMA Band1/Rx_WCDMA Band2 of WCDMA system Band1/Band2 to a pair of digital baseband receive signals RxDBI and RxDBQ is performed in frequency. In a transmit and receive parallel processing mode by means of WCDMA system Band1/Band2, the antenna switch MMIC responds to a control signal B.B_Cnt, and performs transmission of an RF transmit signal and reception of an RF receive signal in parallel by connecting between the input-output terminal I/O and transmitting and receiving terminal TRx1 steadily.

Now, assumed is the case where a pair of digital baseband transmit signals TxDBI and TxDBQ from the baseband signal-processing LSI (BB_LSI) is to be up-converted to WCDMA system Band5 in frequency. In this case, the transmit signal-processing unit Tx_SPU of the RF IC performs up-conversion of the pair of digital baseband transmit signals TxDBI and TxDBQ to WCDMA system Band5 in frequency. The resultant RF transmit signals Tx_WCDMA Band5 of WCDMA system Band5 are amplified by the high-output power amplifier W_PA2 in electric power, made to pass through the duplexer DUP2, and supplied to the transmitting and receiving terminal TRx5 of the antenna switch MMIC. The RF transmit signals Tx_WCDMA Band5 of WCDMA system Band5 supplied to the transmitting and receiving terminal TRx5 can be sent out from the transmitting and receiving antenna ANT through the common input-output terminal I/O.

An RF receive signal Rx_WCDMA Band5 of WCDMA system Band5 received through the transmitting and receiving antenna ANT is supplied to the common input-output terminal I/O of the antenna switch MMIC. The RF receive signal Rx_WCDMA Band5 of WCDMA system Band5, which has entered through the transmitting and receiving terminal TRx5 of the antenna switch MMIC, is made to pass through the duplexer DUP2, and amplified by a low-noise amplifier LNA6 of the RF IC. A signal subjected to amplification by the low-noise amplifier LNA6 is supplied to the receive signal-processing unit Rx_SPU. The receive signal-processing unit Rx_SPU performs down-conversion of an RF receive signal Rx_WCDMA Band5 of WCDMA system Band5 to a pair of digital baseband receive signals RxDBI and RxDBQ in frequency.

In a parallel processing mode involved with transmit and receive operations according to WCDMA system Band5, the antenna switch MMIC responds to a control signal B.B_Cnt, and performs transmission of an RF transmit signal and reception of an RF receive signal in parallel by connecting between the input-output terminal I/O and transmitting and receiving terminal TRx5 steadily.

While the invention made by the inventors has been specifically described above based on the embodiments, the invention is not so limited. It is needless to say that various changes and modifications may be made without departing from the subject matter hereof.

For instance, as to the mobile phone as shown in FIG. 28, the communication RF IC and the baseband signal-processing LSI are formed in separate semiconductor chips respectively. However, the RF IC and LSI can be integrated into one semiconductor chip to form an integrated one-chip according to another embodiment of the invention.

What is claimed is:

1. A transceiver comprising:
a receiver including a receiver-side demodulator for converting a received RF receive signal into an analog receive signal; and
a transmitter including a transmitter-side modulator for converting an analog transmit signal into an RF transmit signal,
wherein the transmitter further includes
a digital-to-analog converter for converting a digital transmit signal into the analog transmit signal;
a transmitter-side voltage-controlled oscillator; and
a transmitter-side divider for frequency-dividing a transmitter-side oscillating output signal produced by the transmitter-side voltage-controlled oscillator thereby to produce first and second transmitter-side local signals to be supplied to the transmitter-side modulator,
wherein a dividing factor of the transmitter-side divider is set to a non-integral number larger than one,
wherein the transmitter-side divider having the dividing factor set to the non-integral number is composed of a logic divider which performs a logic operation thereby to produce the first and second transmitter-side local signals differing in phase,
wherein the first and second transmitter-side local signals produced by the transmitter-side divider are a pair of non-quadrature local signals having a phase difference of 90° plus a predetermined local offset angle,
wherein the digital transmit signal comprises a pair of quadrature transmit signals having a phase difference of about 90° on an analog basis, wherein the transmitter further includes a phase-shift unit for converting the pair of quadrature transmit signals into a pair of non-quadrature shifted transmit signals having a phase difference of 90° plus a predetermined transmit signal offset angle on an analog basis, wherein mixing of the pair of non-quadrature shifted transmit signals from the phase-shift unit, and the pair of non-quadrature local signals from the transmitter-side divider is performed in the transmitter-side modulator of the transmitter, and wherein the RF transmit signal is formed by outputs of the transmitter-side modulator of the transmitter according to quadrature modulation as a result of the mixing.

2. The transceiver of claims 1, wherein the transmitter-side modulator includes a first mixer, a second mixer and an adder, wherein the transmitter-side oscillating output signal produced by the transmitter-side voltage-controlled oscillator is supplied to the transmitter-side divider, and the transmitter-side divider produces the first and second transmitter-side local signals to be supplied to the first and second mixers respectively, wherein an analog signal phase difference between first and second analog transmit signals to be supplied to the first and second mixers respectively as the pair of non-quadrature shifted transmit signals is 90° plus a predetermined analog offset angle, and wherein the RF transmit signal is formed by an output of the adder connected to outputs of the first and second mixers of the transmitter-side modulator.

3. The transceiver of claim 2, wherein the digital transmit signal includes first and second digital transmit signals, wherein the first and second digital transmit signals are supplied to first and second input terminals of the phase-shift unit, respectively, wherein the digital-to-analog converter includes a first digital-to-analog converter supplied with a first digital shifted transmit signal from a first output terminal of the phase-shift unit, a second digital-to-analog converter supplied with second digital shifted transmit signal from a second output terminal of the phase-shift unit, and the first digital shifted transmit signal from the first output terminal of the phase-shift unit and the second digital shifted transmit signal from the second output terminal are set to have a phase difference of 90° plus the predetermined transmit signal offset angle on an analog basis.

4. The transceiver of claim 2, wherein the digital transmit signal includes first and second digital transmit signals, wherein the digital-to-analog converter includes a first digital-to-analog converter supplied with the first digital transmit signal, and a second digital-to-analog converter supplied with the second digital transmit signal, wherein the first analog transmit signal from the first digital-to-analog converter and the second analog transmit signal from the second digital-to-analog converter are supplied to first and second input terminals of the phase-shift unit, respectively, wherein the first and second analog transmit signals to be supplied to the first and second mixers of the transmitter-side modulator respectively are produced from the first and second input terminals of the phase-shift unit, and wherein the first analog transmit signal arising at the first output terminal of the phase-shift unit, and the second analog transmit signal arising at the second output terminal are set to have a phase difference of 90° plus the predetermined transmit signal offset angle.

5. The transceiver of claim 2, wherein an oscillating frequency of the transmitter-side oscillating output signal produced by the transmitter-side voltage-controlled oscillator is controlled by a phase lock loop including, in its closed loop, the transmitter-side voltage-controlled oscillator, an oscillation divider, a phase comparator and a low-pass filter.

6. The transceiver of claim 5, wherein a sum of the predetermined local offset angle and the predetermined transmit signal offset angle is substantially zero.

7. The transceiver of claim 5, wherein the transmitter-side modulator, the transmitter-side voltage-controlled oscillator, and the transmitter-side divider constitute a transmitter according to one of a direct up-conversion transmitter architecture and a low-IF up-conversion transmitter architecture.

8. The transceiver of claim 7, wherein the transmitter transmits the RF transmit signal having a frequency set within a range between about 1.7 and 2.0 GHz according to WCDMA system.

9. The transceiver of claim 2, wherein the receiver-side demodulator of the receiver, the transmitter-side modulator, the digital-to-analog converter, the transmitter-side voltage-controlled oscillator, the transmitter-side divider, and the phase-shift unit of the transmitter are arranged into a semiconductor chip.

10. The transceiver of claim 2, wherein the non-integral number of the dividing factor of the transmitter-side divider is set to a ratio of an odd number and an even number, or a ratio of different odd numbers.

* * * * *